US 11,211,988 B2

(12) United States Patent
Liu

(10) Patent No.: US 11,211,988 B2
(45) Date of Patent: *Dec. 28, 2021

(54) METHOD FOR DETERMINING PRECODING MATRIX INDICATOR, RECEIVING DEVICE, AND SENDING DEVICE

(71) Applicant: Huawei Technologies Co., Ltd., Shenzhen (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

This patent is subject to a terminal disclaimer.

(21) Appl. No.: 16/600,746

(22) Filed: Oct. 14, 2019

(65) Prior Publication Data

US 2020/0044717 A1 Feb. 6, 2020

Related U.S. Application Data

(63) Continuation of application No. 16/006,224, filed on Jun. 12, 2018, now Pat. No. 10,469,150, which is a
(Continued)

(51) Int. Cl.
*H04W 4/00* (2018.01)
*H04B 7/06* (2006.01)
(Continued)

(52) U.S. Cl.
CPC ......... *H04B 7/0639* (2013.01); *H04B 7/0413* (2013.01); *H04B 7/0417* (2013.01); *H04B 7/0478* (2013.01)

(58) Field of Classification Search
CPC ..... H04W 72/04; H04W 88/08; H04W 76/00; H04B 7/0639; H04B 7/0413; H04B 7/0417; H04B 7/0478
See application file for complete search history.

(56) References Cited

U.S. PATENT DOCUMENTS 8,391,392 B2   3/2013   Melzer et al.
8,737,507 B2   5/2014   Astely et al.
(Continued)

FOREIGN PATENT DOCUMENTS

CN   101635612 A   1/2010
CN   101686079 A   3/2010
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.3.0 (Sep. 2011), pp. 1-103.
(Continued)

*Primary Examiner* — Siren Wei
(74) *Attorney, Agent, or Firm* — Slater Matsil, LLP

(57) ABSTRACT

Embodiments of the present invention provide a method for determining a precoding matrix indicator, a receiving device, and a sending device. The method for determining a precoding matrix indicator includes: selecting, by a receive end, a precoding matrix W from a codebook based on a reference signal sent by a transmit end, where the precoding matrix W is a product of two matrices W1 and W2, where the W1 includes $N_B$ block matrices $X_i$, $N_B \geq 1$, and the W1 is indicated as: W1=diag$\{X_1, \ldots, X_{N_B}\}$, where $1 \leq i \leq N_B$, and a column $x_{i,j}$ of each block matrix $X_i$ is a Kronecker kronecker product of a first vector $A_{ij}$ and a second vector $B_{ij}$, that is, $x_{ij}=A_{ij} \otimes B_{ij}$; and sending, by the receive end, a precoding matrix indicator PMI corresponding to the precoding matrix W to the transmit end, so that the transmit end obtains the precoding matrix W according to the PMI.

28 Claims, 8 Drawing Sheets

Related U.S. Application Data continuation of application No. 15/014,392, filed on Feb. 3, 2016, now Pat. No. 10,009,087, which is a continuation of application No. PCT/CN2013/081082, filed on Aug. 8, 2013.

(51) Int. Cl.
*H04B 7/0417* (2017.01)
*H04B 7/0456* (2017.01)
*H04B 7/0413* (2017.01)

(56) References Cited

U.S. PATENT DOCUMENTS

| | | | |
|---|---|---|---|
| 9,209,877 B2 | 12/2015 | Wang et al. | |
| 9,214,996 B2 | 12/2015 | Kim et al. | |
| 10,439,691 B2* | 10/2019 | Park | H04B 7/0473 |
| 2009/0003466 A1 | 1/2009 | Taherzadehboroujeni et al. | |
| 2010/0045494 A1 | 2/2010 | Clerckx et al. | |
| 2010/0322343 A1 | 12/2010 | Yeon et al. | |
| 2011/0080969 A1 | 4/2011 | Jöngren et al. | |
| 2011/0110405 A1 | 5/2011 | Moon, II et al. | |
| 2011/0170638 A1 | 7/2011 | Yuan et al. | |
| 2011/0205930 A1 | 8/2011 | Rahman et al. | |
| 2011/0216846 A1 | 9/2011 | Moon, II et al. | |
| 2011/0235743 A1 | 9/2011 | Moon, II et al. | |
| 2011/0249712 A1 | 10/2011 | Hammarwall et al. | |
| 2011/0268207 A1 | 11/2011 | Choi et al. | |
| 2011/0274188 A1 | 11/2011 | Sayana et al. | |
| 2012/0039402 A1 | 2/2012 | Clerckx et al. | |
| 2012/0082248 A1 | 4/2012 | Han et al. | |
| 2012/0106595 A1 | 5/2012 | Bhattad et al. | |
| 2012/0218948 A1 | 8/2012 | Onggosanusi et al. | |
| 2012/0219042 A1 | 8/2012 | Onggosanusi et al. | |
| 2012/0238039 A1 | 9/2012 | Cha et al. | |
| 2012/0269290 A1 | 10/2012 | Onggosanusi et al. | |
| 2012/0322492 A1 | 12/2012 | Koo et al. | |
| 2012/0328039 A1 | 12/2012 | Mazzarese et al. | |
| 2013/0010880 A1 | 1/2013 | Koivisto et al. | |
| 2013/0028341 A1 | 1/2013 | Ayach et al. | |
| 2013/0028344 A1 | 1/2013 | Chen et al. | |
| 2013/0034179 A1 | 2/2013 | Zhang et al. | |
| 2013/0058305 A1 | 3/2013 | Jang et al. | |
| 2013/0058386 A1 | 3/2013 | Mazzarese | |
| 2013/0058424 A1 | 3/2013 | Enescu et al. | |
| 2013/0100996 A1 | 4/2013 | Clerckx et al. | |
| 2013/0114654 A1 | 5/2013 | Gomadam | |
| 2013/0129018 A1 | 5/2013 | Ko et al. | |
| 2013/0142277 A1 | 6/2013 | Yeon et al. | |
| 2013/0156125 A1 | 6/2013 | Ko et al. | |
| 2013/0163687 A1 | 6/2013 | Jing et al. | |
| 2013/0230081 A1 | 9/2013 | Wernersson et al. | |
| 2013/0259151 A1 | 10/2013 | Thomas et al. | |
| 2013/0308715 A1* | 11/2013 | Nam | H04B 7/0626 375/267 |
| 2013/0315328 A1 | 11/2013 | Liu | |
| 2014/0098689 A1 | 4/2014 | Lee et al. | |
| 2014/0133595 A1 | 5/2014 | Mazzarese et al. | |
| 2014/0146778 A1 | 5/2014 | Wang et al. | |
| 2014/0177744 A1 | 6/2014 | Krishnamurthy et al. | |
| 2014/0177745 A1 | 6/2014 | Krishnamurthy et al. | |
| 2014/0192762 A1 | 7/2014 | Li et al. | |
| 2014/0226702 A1 | 8/2014 | Onggosanusi et al. | |
| 2014/0301492 A1 | 10/2014 | Xin et al. | |
| 2015/0012551 A1 | 1/2015 | Dong et al. | |
| 2015/0049829 A1 | 2/2015 | Zhuang et al. | |
| 2015/0244438 A1 | 8/2015 | Ding et al. | |
| 2015/0256243 A1 | 9/2015 | Wang et al. | |
| 2016/0043789 A1 | 2/2016 | Wang et al. | |
| 2017/0366241 A1 | 12/2017 | Ko et al. | |
| 2018/0097553 A1 | 4/2018 | Wang et al. | |

FOREIGN PATENT DOCUMENTS

| | | |
|---|---|---|
| CN | 101771444 A | 7/2010 |
| CN | 101969366 A | 2/2011 |
| CN | 102075274 A | 5/2011 |
| CN | 102082637 A | 6/2011 |
| CN | 102111197 A | 6/2011 |
| CN | 102122983 A | 7/2011 |
| CN | 102130752 A | 7/2011 |
| CN | 102273091 A | 12/2011 |
| CN | 102299732 A | 12/2011 |
| CN | 102299775 A | 12/2011 |
| CN | 102412885 A | 4/2012 |
| CN | 102714647 A | 10/2012 |
| CN | 102832984 A | 12/2012 |
| CN | 102835054 A | 12/2012 |
| CN | 102870344 A | 1/2013 |
| CN | 102932112 A | 2/2013 |
| CN | 102938688 A | 2/2013 |
| CN | 102959878 A | 3/2013 |
| CN | 103039014 A | 4/2013 |
| CN | 103560818 A | 2/2014 |
| CN | 103621000 A | 3/2014 |
| CN | 103782533 A | 5/2014 |
| EP | 2557700 A2 | 2/2013 |
| EP | 2590338 A2 | 5/2013 |
| EP | 2755417 A1 | 7/2014 |
| EP | 2820773 A1 | 1/2015 |
| EP | 2820773 B1 | 12/2017 |
| JP | 2012531087 A | 12/2012 |
| JP | 2015528669 A | 9/2015 |
| JP | 2015536099 A | 12/2015 |
| JP | 2016532184 A | 10/2016 |
| WO | 2009096708 A1 | 8/2009 |
| WO | 2010106443 A2 | 9/2010 |
| WO | 2011082626 A1 | 7/2011 |
| WO | 2011136627 A2 | 11/2011 |
| WO | 2012002767 A2 | 1/2012 |
| WO | 2012026742 A2 | 3/2012 |
| WO | 2013024350 A2 | 2/2013 |
| WO | 2013024351 A1 | 2/2013 |
| WO | 2013034109 A1 | 3/2013 |
| WO | 2013129985 A1 | 9/2013 |
| WO | WO-2013129985 A1 * | 9/2013 ........... H04B 7/0617 |
| WO | 2013185320 A1 | 12/2013 |
| WO | 2014007591 A1 | 1/2014 |

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213 V10.3.0 (Sep. 2011), pp. 1-122.

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0 (Jun. 2013), pp. 1-108.

"3rd Generation Partnership Project; Technical Specification Group Radio Access Network; Evolved Universal Terrestrial Radio Access (E-UTRA); Multiplexing and channel codinq (Release 11)," 3GPP TS 36.212 V11.3.0 (Jun. 2016), pp. 1-84.

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0 (Jun. 2013), pp. 1-176.

"Study on Downlink Enhancements for Elevation Beamforming for LTE," 3GPP Work Item Description (6 pp.).

3GPP TS 36.212 V11.3.0 (Jun. 2013), "3rd Generation Partnership Project; Technical Specification Group Radio Access Network; Evolved Universal Terrestrial Radio Access (E-UTRA); Multiplexing and channel coding (Release 11)," pp. 1-84.

Alcatel-Lucent Shanghai Bell, Alcatel-Lucent, "Considerations on CSI feedback enhancement for high-priority antenna configurations," 3GPP TSG-RAN WG1 #66, R1-112420, Athens, Greece, Aug. 22-26, 2011 (7 pp.).

CATT, "Performance evaluation of 8Tx preceding," 3GPP TSG-RAN WG1 Meeting #61, R1-102658, Montreal, Canada, May 10-14, 2010 (7 pp.).

CMCC, Huawei, Ericsson, "TP on multiple-column array antenna modeling,"3GPP TSG-RAN4 Meeting #64bis, R4-125978, Santa Rosa, US, Oct. 8-12, 2012 (7 pp.).

(56) References Cited

OTHER PUBLICATIONS

Extended European Search Report, dated Apr. 8, 2016, in corresponding European Application No. 13891226.6 (8 pp.).
International Search Report, dated Jun. 4, 2014, in corresponding International Application No. PCT/CN2013/081082 (8 pp.).
Japanese Office Action dated Mar. 7, 2017 in corresponding Japanese Patent Application No. 2016532184 (6 pp.).
Notice of Allowance, dated May 29, 2018, in U.S. Appl. No. 15/014,392, (9 pp.).
Office Action dated Aug. 24, 2017, in U.S. Appl. No. 15/014,392 (29 pp.).
Office Action, dated Dec. 3, 2018, in Japanese Application No. 2017243760 (5 pp.).
Samsung, "New SID Proposal: Study on Full Dimension MIMO for LTE," 3GPP TSG RAN Meeting #57, RP-121410, Chicago, USA, Sep. 4-7, 2012 (7 pp,).
U.S. Appl. No. 15/014,392, filed Feb. 3, 2016, Liu, Assignee "Huawei Technologies Co., Ltd".
Written Opinion of the International Searching Authority, dated Jun. 4, 2014, in corresponding International Application No. PCT/CN2013/081082 (9 pp.).
3GPP TS 36.211 V10.4.0 (Dec. 2011), 3rd Generation Partnership Project; Technical Specification Group Radio Access Network; Evolved Universal Terrestrial Radio Access (E-UTRA); Physical Channels and Modulation (Release 10),total 101 pages.
3GPP TS 36.211 V11.2.0 (Feb. 2013), 3rd Generation Partnership Project; Technical Specification Group Radio Access Network; Evolved Universal Terrestrial Radio Access (E-UTRA); Physical Channels and Modulation (Release 11), total 109 pages.
3GPP TS 36.212 V11.2.0 (Feb. 2013), 3rd Generation Partnership Project; Technical Specification Group Radio Access Network; Evolved Universal Terrestrial Radio Access (E-UTRA); Multiplexing and channel coding (Release 11), total 82 pages.
3GPP TS 36.213 V10.5.0 (Feb. 2012), 3rd Generation Partnership Project; Technical Specification Group Radio Access Network; Evolved Universal Terrestrial Radio Access (E-UTRA); Physical layer procedures (Release 10), total 125 pages.
3GPP TS 36.213 V11.2.0 3rd Generation Partnership Project; Technical Specification Group Radio Access Network Evolved Universal Terrestrial Radio Access (E-UTRA); Physical layer procedures (Release 11), Technical Specification, Feb. 2013, 173 pages.
3GPP TS 36.331 V10.8.0 (Dec. 2012); 3rd Generation Partnership Project; Technical Specification Group Radio Access Network; Evolved Universal Terrestrial Radio Access (E-UTRA); Radio Resource Control (RRC); Protocol specification (Release 10), total 305 pages.

3GPP TS 36.331 V11.3.0 3rd Generation Partnership Project; Technical Specification Group Radio Access Network Evolved Universal Terrestrial Radio Access (E-UTRA); Radio Resource Control (RRC); Protocol specification (Release 11), Technical Specification, Mar. 2013, 343 pages.
3GPP TSG RAN WG1 Meeting #60bis, R1-102508, Rapporteur (NTT Docomo): Simulation Assumption for 8 Tx Codebook Design, Beijing, China, Apr. 12-16, 2010, 8 pages.
Alcatel-Lucent et al., "Way Forward on 8Tx Codebook for Rel.10 DL MIMO," 3GPP TSG RAN WG1 62 Madrid, Spain, Aug. 23-27, 2010, R1-105011, 6 pages.
Alcatel-Lucent, Alcatel-Lucent Shanghai Bell, "CQI/PMI reporting modes on PUCCH for two-stage feedback," 3GPP TSG RAN WG1 Meeting #62, Madrid, Spain, Aug. 23-27, 2010, R1-104397, 4 pages.
Catt, "PMI/RI/CQI reporting for LTE-A, "3GPP TSG RAN WG1 Meeting #60bis Beijing, China, Apr. 12-16, 2010, R1-102056, total 4 pages.
Ericsson et al., "Design and Evaluation of Precoder Codebooks for CSI Feedback", 3GPP TSG-RAN WG1 #61 bis R1-103839, Dresden, Germany, Jun. 28-Jul. 2, 2010, total 12 pages.
Ericsson, "Further considerations on dual layer beamforming," 3GPP TSG-RAN WG1 #57 San Francisco, USA, May 1-8, 2009, R1-092187, 5 pages.
LG Electronics, "Feedback Codebook Enhancement and Performance Evaluation", 3GPP TSG RAN WG1 Meeting #62 R1-104768, Madrid, Spain, Aug. 23-28, 2010, total 9 pages.
LG Electronics, "UCI transmission for Simultaneous PUCCH/PUSCH configuration", 3GPP TSG RAN WG1 Meeting #63bis R1-110395, Dublin, Ireland, Jan. 17-21, 2011, total 4 pages.
Pantech, "Extension of Rel-8 codebook for dual stage Rel-10 precoder," 3GPP TSG-RAN WG1#60bis R1-102409, Apr. 16, 2010,total 3 pages.
Phillip A Regaliat, et al., "Kronecker Products, Unitary Matrices and Signal Processing Applications", vol. 31, No. 4, Dec. 1989, Society for Industrial and Applied Mathematics, 28 pages.
R1-102724 LG Electronics, "Consideration on feedback design for LTE-A", 3GPP TSG RAN WG1 Meeting #61, Montreal, Canada, May 10-14, 2010, total 4 pages.
R1-112420 Alcatel-Lucent Shanghai Bell et al., "Considerations on CSI feedback enhancements for high-priority antenna configurations", 3GPP TSG-RAN WG1 #66, Aug. 22-26, 2011, total 7 pages.
R1-131761, Huawei et al., "WF on antenna model in 3D channel modeling", 3GPP TSG RAN WG1 #72bis, Chicago, USA, Apr. 15-19, 2013, total 7 pages.
Samsung, "Views on the feedback framework for Rel. 10," 3GPP TSG RAN WG1 Meeting #61 Montreal, Canada, May 10-14, 2010, R1-103377, 17 pages.

* cited by examiner

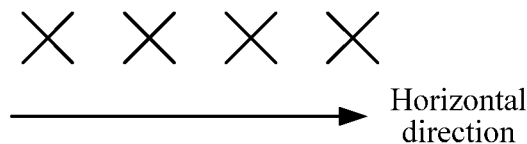

Horizontal direction

FIG. 1

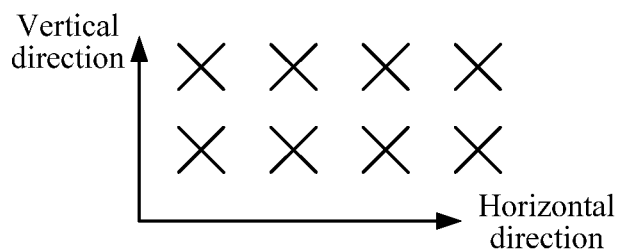

FIG. 2

A receive end selects a precoding matrix W from a codebook based on a reference signal sent by a transmit end, where the precoding matrix W is a product of two matrices W1 and W2, where the W1 includes $N_B$ block matrices $X_i$, $N_B \geq 1$, and the W1 is indicated as: $W1=diag\{X_1,\ldots X_{NB}\}$, where a column $X_{i,j}$ of each block matrix $X_i$ is a Kronecker kronecker product of a first vector $A_{ij}$ and a second vector $B_{ij}$, that is, $X_{ij}=A_{ij}\otimes B_{ij}$ ~ 301

The receive end sends a precoding matrix indicator PMI corresponding to the precoding matrix W to the transmit end, so that the transmit end obtains the precoding matrix W of an antenna array at the receive end according to the PMI ~ 302

METHOD FOR DETERMINING PRECODING MATRIX INDICATOR, RECEIVING DEVICE, AND SENDING DEVICE

CROSS-REFERENCE TO RELATED APPLICATIONS

This application is a continuation of U.S. patent application Ser. No. 16/006,224, filed on Jun. 12, 2018, which is a continuation of U.S. patent application Ser. No. 15/014,392, filed on Feb. 3, 2016, now U.S. Pat. No. 10,009,087, which is a continuation of International Application No. PCT/CN2013/081082, filed on Aug. 8, 2013. All of the aforementioned patent applications are hereby incorporated by reference in their entireties.

TECHNICAL FIELD

Embodiments of the present invention relate to the field of communications technologies, and in particular, to a method for determining a precoding matrix indicator, a receiving device, and a sending device.

BACKGROUND

On a wireless communications network, a multiple-input multiple-output (MIMO) wireless communications system may obtain a diversity gain and an array gain by using a precoding technology at a transmit end and a receive signal combination technology. A system using precoding may be expressed as: $y=H\hat{V}s+N$, where y is a receive signal vector, H is a channel matrix, $\hat{V}$ is a precoding matrix, s is a transmit symbol vector, and N is measurement noise.

Generally, optimal precoding requires that channel state information (CSI) be fully known by a transmitter, and a commonly used method is that user equipment (UE) performs quantization on instantaneous CSI and reports the quantized instantaneous CSI to a base station. Generally, a receive end (for example, the UE) may obtain an estimated channel matrix H based on a reference signal, namely, the receive signal vector y, sent by a transmit end (for example, the base station), according to a known predefined transmitted pilot signal s, namely, the transmit symbol vector s, and the measurement noise N, or referred to as white Gaussian noise, and according to the formula: $y=H\hat{V}s+n$; and then select the precoding matrix $\hat{V}$ that best matches the channel matrix H from a codebook, so that channel transmission quality and a channel transmission rate during actual data transmission are relatively high.

The user equipment includes a mobile station (MS), a relay, a mobile phone, a handset, portable equipment, or the like; the base station includes a NodeB base station (BS), an access point, a transmission point (TP), an evolved NodeB (eNB), a relay, or the like. CSI information reported by an existing Long Term Evolution (LTE) system includes information such as a rank indicator (RI), a precoding matrix indicator (PMI), and a channel quality indicator (CQI), where the RI and the PMI respectively indicate a quantity of used transport layers and a used precoding matrix. For a correspondence between a precoding matrix indicator PMI and a precoding matrix, reference can be made to the 3rd Generation Partnership Project (3GPP for short) TS 36.213, and each precoding matrix in which an element is included in a complex value is corresponding to one indicator number (a precoding matrix indicator PMI) in a codebook table. Generally, a set of used precoding matrices is referred to as a codebook, where each precoding matrix in the set is a code word in the codebook.

FIG. 1 is a schematic structural diagram of a one-dimensional linear array antenna. As shown in FIG. 1, distribution of the linear array antenna includes only one direction, and the direction is generally referred to as a horizontal direction. FIG. 2 is a schematic structural diagram of a two-dimensional planar array antenna. As shown in FIG. 2, distribution of the two-dimensional planar array antenna includes two directions: a horizontal direction and a vertical direction. An existing codebook is generally designed for a one-dimensional linear array. However, for two or more rows of antenna arrays, use of an existing precoding matrix in an array structure of a one-dimensional linear array antenna causes a decrease in precoding precision, thereby causing a relatively heavy loss in performance and a decrease in a system throughput.

SUMMARY

Embodiments of the present invention provide a method for determining a precoding matrix indicator, a receiving device, and a sending device, to overcome a problem that precoding precision is low because a precoding matrix in the prior art cannot reflect different characteristics of two directions of a two-dimensional planar array antenna.

According to a first aspect, an embodiment of the present invention provides a method for determining a precoding matrix indicator, including: selecting, by a receive end, a precoding matrix W from a codebook based on a reference signal sent by a transmit end, where the precoding matrix W is a product of two matrices W1 and W2, where the W1 includes $N_B$ block matrices $X_i$, $N_B \geq 1$, and the $W_1$ is indicated as: $W1=\text{diag}\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij} \otimes B_{ij}$; and sending, by the receive end, a precoding matrix indicator PMI corresponding to the precoding matrix W to the transmit end, so that the transmit end obtains the precoding matrix W according to the PMI.

In a first possible implementation manner of the first aspect, all columns of the block matrix $X_i$ are obtained by pairwisely successively calculating Kronecker products of N1 consecutive first vectors and N2 consecutive second vectors.

According to the first possible implementation manner of the first aspect, in a second possible implementation manner, N1 is greater than or equal to N2.

According to the first aspect, or the first or the second possible implementation manner of the first aspect, in a third possible implementation manner, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

According to the third possible implementation manner of the first aspect, in a fourth possible implementation manner, s1 is greater than or equal to s2.

According to a second aspect, an embodiment of the present invention provides a method for determining a precoding matrix indicator, including: selecting, by a receive end, a precoding matrix W from a codebook based on a reference signal sent by a transmit end, where the precoding matrix W is a product of a matrix W1 and a matrix W2, where the W1 includes $N_B$ block matrices $X_i$, $N_B \geq 1$, and the $W_1$ is indicated as: W1=diag $\{X_1, \ldots, X_{N_B}\}$, where $1 \leq i \leq N_B$, each block matrix $X_i$ is a Kronecker product of a first codebook $A_i$ and a second codebook $B_i$, that is, $X_i = A_i \otimes B_i$, each column of the first codebook $A_i$ is an M-dimensional discrete Fourier transform DFT vector, M>1, each column of the second codebook $B_i$ is an N-dimensional DFT vector, and N>1; and sending, by the receive end, a precoding matrix indicator PMI corresponding to the precoding matrix W to the transmit end.

In a first possible implementation manner of the second aspect, all phase differences between any two adjacent columns of DFT vectors in the first codebook $A_i$ are equal.

According to the first possible implementation manner of the second aspect, in a second possible implementation manner, each column of the first codebook is selected at an equal interval from $N_a$ M-dimensional DFT vectors that are distributed at an equal interval within a phase range [0, 2π], and $N_a$>1.

According to the second aspect, or the first or the second possible implementation manner of the second aspect, in a third possible implementation manner, at least two phase differences between two adjacent columns of DFT vectors in the second codebook $B_i$ are not equal.

According to the third possible implementation manner of the second aspect, in a fourth possible implementation manner, each column of the second codebook is selected from $N_e$ N-dimensional DFT vectors that are distributed at an unequal interval within a phase range [0, π], and $N_e$>1.

According to the second aspect or any one of the first to the fourth possible implementation manners of the second aspect, in a fifth possible implementation manner, a quantity of first codebooks is greater than or equal to a quantity of second codebooks.

According to the second aspect or any one of the first to the fifth possible implementation manners of the second aspect, in a sixth possible implementation manner, a phase difference between any two adjacent columns of DFT vectors in the second codebook $B_i$ is greater than or equal to a phase difference between any two adjacent columns of DFT vectors in the first codebook $A_i$.

According to the second aspect or any one of the first to the sixth possible implementation manners of the second aspect, in a seventh possible implementation manner, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

According to the second aspect or any one of the first to the seventh possible implementation manners of the second aspect, in an eighth possible implementation manner, the matrix W2 is used to select a column vector of the matrix W1 to constitute the matrix W, or is used to perform a weighted combination on column vectors of the matrix W1 to constitute the matrix W.

According to a third aspect, an embodiment of the present invention provides a method for determining a precoding matrix indicator, including: selecting, by a receive end, a precoding matrix W from a codebook based on a reference signal sent by a transmit end, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \leq i \leq n-1$, n is a quantity of first precoding matrices that constitute the Wa, and n>1; and the Wb is a third precoding matrix, where Wb=Φ×Wa, and the Φ is a phase rotation matrix of the Wa; and sending, by the receive end, a precoding matrix indicator PMI corresponding to the precoding matrix W to the transmit end.

In a first possible implementation manner of the third aspect, the phase rotation matrix is a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

and $\varphi_i = e^{j\theta_i}$, $\theta_i \in [0, 2\pi]$.

According to the third aspect or the first possible implementation manner of the third aspect, in a second possible implementation manner, each column of the first precoding matrix is a discrete Fourier transform DFT vector, or a column vector of a Hadamard matrix.

According to the third aspect or the first possible implementation manner of the third aspect, in a third possible implementation manner, the first precoding matrix is selected from a two-antenna codebook, a four-antenna codebook, or an eight-antenna codebook in a Long Term Evolution LTE system.

According to a fourth aspect, an embodiment of the present invention provides a method for determining a precoding matrix, including: sending, by a transmit end, a reference signal to a receive end; receiving, by the transmit end, a precoding matrix indicator PMI sent by the receive end; and determining, by the transmit end according to the precoding matrix indicator PMI, a precoding matrix W selected by the receive end from a codebook based on the reference signal, where the precoding matrix W is a product of two matrices W1 and W2, where the W1 includes $N_B$ block matrices $X_i$, $N_B \geq 1$, and the $W_1$ is indicated as: W1=diag$\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij} = A_{ij} \otimes B_{ij}$.

In a first possible implementation manner of the fourth aspect, all columns of the block matrix $X_i$ are obtained by pairwisely successively calculating Kronecker products of N1 consecutive first vectors and N2 consecutive second vectors.

According to the first possible implementation manner of the fourth aspect, in a second possible implementation manner, N1 is greater than or equal to N2.

According to the fourth aspect, or the first or the second possible implementation manner of the fourth aspect, in a third possible implementation manner, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

According to the third possible implementation manner of the fourth aspect, in a fourth possible implementation manner, s1 is greater than or equal to s2.

According to a fifth aspect, an embodiment of the present invention provides a method for determining a precoding matrix, including: sending, by a transmit end, a reference signal to a receive end; receiving, by the transmit end, a precoding matrix indicator PMI sent by the receive end; and determining, by the transmit end according to the precoding matrix indicator PMI, a precoding matrix W selected by the receive end from a codebook based on the reference signal, where the precoding matrix W is a product of a matrix W1 and a matrix W2, where the W1 includes $N_B$ block matrices $X_i$, $N_B \geq 1$, and the $W_1$ is indicated as: W1=diag$\{X_1, \ldots, X_{N_B}\}$, where $1 \leq i \leq N_B$, each block matrix $X_i$ is a Kronecker product of a first codebook $A_i$ and a second codebook $B_i$, that is, $X_i = A_i \otimes B_i$, each column of the first codebook $A_i$ is an M-dimensional discrete Fourier transform DFT vector, M>1, each column of the second codebook $B_i$ is an N-dimensional DFT vector, and N>1.

In a first possible implementation manner of the fifth aspect, all phase differences between any two adjacent columns of DFT vectors in the first codebook $A_i$ are equal.

According to the first possible implementation manner of the fifth aspect, in a second possible implementation manner, each column of the first codebook is selected at an equal interval from $N_a$ M-dimensional DFT vectors that are distributed at an equal interval within a phase range [0, 2π], and $N_a$>1.

According to the fifth aspect, or the first or the second possible implementation manner of the fifth aspect, in a third possible implementation manner, at least two phase differences between two adjacent columns of DFT vectors in the second codebook $B_i$ are not equal.

According to the third possible implementation manner of the fifth aspect, in a fourth possible implementation manner, each column of the second codebook is selected from $N_e$ N-dimensional DFT vectors that are distributed at an unequal interval within a phase range [0, π], and $N_e$>1.

According to the fifth aspect or any one of the first to the fourth possible implementation manners of the fifth aspect, in a fifth possible implementation manner, a quantity of first codebooks is greater than or equal to a quantity of second codebooks.

According to the fifth aspect or any one of the first to the fifth possible implementation manners of the fifth aspect, in a sixth possible implementation manner, a phase difference between any two adjacent columns of DFT vectors in the second codebook $B_i$ is greater than or equal to a phase difference between any two adjacent columns of DFT vectors in the first codebook $A_i$.

According to the fifth aspect or any one of the first to the sixth possible implementation manners of the fifth aspect, in a seventh possible implementation manner, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

According to the fifth aspect or any one of the first to the seventh possible implementation manners of the fifth aspect, in an eighth possible implementation manner, the matrix W2 is used to select a column vector of the matrix W1 to constitute the matrix W, or is used to perform a weighted combination on column vectors of the matrix W1 to constitute the matrix W.

According to a sixth aspect, an embodiment of the present invention provides a method for determining a precoding matrix, including: sending, by a transmit end, a reference signal to a receive end; receiving, by the transmit end, a precoding matrix indicator PMI sent by the receive end; and determining, by the transmit end according to the precoding matrix indicator PMI, a precoding matrix W selected by the receive end from a codebook based on the reference signal, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \leq i \leq n-1$, n is a quantity of first precoding matrices that constitute the Wa, and n>1; and the Wb is a third precoding matrix, where Wb=Φ×Wa, and the Φ is a phase rotation matrix of the Wa.

In a first possible implementation manner of the sixth aspect, the phase rotation matrix is a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

and $\varphi_i = e^{j\theta_i}$, $\theta_i \in [0, 2\pi]$.

According to the sixth aspect or the first possible implementation manner of the sixth aspect, in a second possible implementation manner, each column of the first precoding matrix is a discrete Fourier transform DFT vector, or a column vector of a Hadamard matrix.

According to the sixth aspect or the first possible implementation manner of the sixth aspect, in a third possible implementation manner, the first precoding matrix is selected from a two-antenna codebook, a four-antenna codebook, or an eight-antenna codebook in a Long Term Evolution LTE system.

According to a seventh aspect, an embodiment of the present invention provides a receiving device, including: a processor, configured to select a precoding matrix W from a codebook based on a reference signal sent by a sending device, where the precoding matrix W is a product of two matrices W1 and W2, where the W1 includes $N_B$ block matrices Xi, $N_B \geq 1$, and the W1 is indicated as: W1=diag$\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij}\otimes B_{ij}$; and a transmitter, configured to send a precoding matrix indicator PMI corresponding to the precoding matrix W to the sending device, so that the sending device obtains the precoding matrix W according to the PMI.

In a first possible implementation manner of the seventh aspect, all columns of the block matrix $X_i$ are obtained by pairwisely successively calculating Kronecker products of N1 consecutive first vectors and N2 consecutive second vectors.

According to the first possible implementation manner of the seventh aspect, in a second possible implementation manner, N1 is greater than or equal to N2.

According to the seventh aspect, or the first or the second possible implementation manner of the seventh aspect, in a third possible implementation manner, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

According to the third possible implementation manner of the seventh aspect, in a fourth possible implementation manner, s1 is greater than or equal to s2.

According to an eighth aspect, an embodiment of the present invention provides a receiving device, including: a processor, configured to select a precoding matrix W from a codebook based on a reference signal sent by a sending device, where the precoding matrix W is a product of a matrix W1 and a matrix W2, where the W1 includes $N_B$ block matrices Xi, $N_B \geq 1$, and the W1 is indicated as: $W1=\text{diag}\{X_1, \ldots, X_{N_B}\}$, where $1 \leq i \leq N_B$, each block matrix $X_i$ is a Kronecker product of a first codebook $A_i$ and a second codebook $B_i$, that is, $X_i = A_i \otimes B_i$, each column of the first codebook $A_i$ is an M-dimensional discrete Fourier transform DFT vector, M>1, each column of the second codebook $B_i$ is an N-dimensional DFT vector, and N>1; and a transmitter, configured to send a precoding matrix indicator PMI corresponding to the precoding matrix W to the sending device.

In a first possible implementation manner of the eighth aspect, all phase differences between any two adjacent columns of DFT vectors in the first codebook $A_i$ are equal.

According to the first possible implementation manner of the eighth aspect, in a second possible implementation manner, each column of the first codebook is selected at an equal interval from $N_a$ M-dimensional DFT vectors that are distributed at an equal interval within a phase range [0, 2π], and $N_a > 1$.

According to the eighth aspect, or the first or the second possible implementation manner of the eighth aspect, in a third possible implementation manner, at least two phase differences between two adjacent columns of DFT vectors in the second codebook $B_i$ are not equal.

According to the third possible implementation manner of the eighth aspect, in a fourth possible implementation manner, each column of the second codebook is selected from $N_e$ N-dimensional DFT vectors that are distributed at an unequal interval within a phase range [0, π], and $N_e > 1$.

According to the eighth aspect or any one of the first to the fourth possible implementation manners of the eighth aspect, in a fifth possible implementation manner, a quantity of first codebooks is greater than or equal to a quantity of second codebooks.

According to the eighth aspect or any one of the first to the fifth possible implementation manners of the eighth aspect, in a sixth possible implementation manner, a phase difference between any two adjacent columns of DFT vectors in the second codebook $B_i$ is greater than or equal to a phase difference between any two adjacent columns of DFT vectors in the first codebook $A_i$.

According to the eighth aspect or any one of the first to the sixth possible implementation manners of the eighth aspect, in a seventh possible implementation manner, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

According to the eighth aspect or any one of the first to the seventh possible implementation manners of the eighth aspect, in an eighth possible implementation manner, the matrix W2 is used to select a column vector of the matrix W1 to constitute the matrix W, or is used to perform a weighted combination on column vectors of the matrix W1 to constitute the matrix W.

According to a ninth aspect, an embodiment of the present invention provides a receiving device, including: a processor, configured to select a precoding matrix W from a codebook based on a reference signal sent by a sending device, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \leq i \leq n-1$, n is a quantity of first precoding matrices that constitute the Wa, and n>1; and the Wb is a third precoding matrix, where Wb=Φ×Wa, and the Φ is a phase rotation matrix of the Wa; and a transmitter, configured to send a precoding matrix indicator PMI corresponding to the precoding matrix W to the sending device.

In a first possible implementation manner of the ninth aspect, the phase rotation matrix is a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

and $\varphi_i = e^{j\theta_i}$, $\theta_i \in [0, 2\pi]$.

According to the ninth aspect or the first possible implementation manner of the ninth aspect, in a second possible implementation manner, each column of the first precoding matrix is a discrete Fourier transform DFT vector, or a column vector of a Hadamard matrix.

According to the ninth aspect or the first possible implementation manner of the ninth aspect, in a third possible implementation manner, the first precoding matrix is selected from a two-antenna codebook, a four-antenna codebook, or an eight-antenna codebook in a Long Term Evolution LTE system.

According to a tenth aspect, an embodiment of the present invention provides a sending device, including: a transmitter, configured to send a reference signal to a receiving device; a receiver, configured to receive a precoding matrix indicator PMI sent by the receiving device; and a processor, configured to determine, according to the precoding matrix indicator PMI, a precoding matrix W selected by the receiving device from a codebook based on the reference signal, where the precoding matrix W is a product of two matrices W1 and W2, where the W1 includes $N_B$ block matrices Xi, $N_B \geq 1$, and the W1 is indicated as: W1=diag$\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij} \otimes B_{ij}$.

In a first possible implementation manner of the tenth aspect, all columns of the block matrix $X_i$ are obtained by pairwisely successively calculating Kronecker products of N1 consecutive first vectors and N2 consecutive second vectors.

According to the first possible implementation manner of the tenth aspect, in a second possible implementation manner, N1 is greater than or equal to N2.

According to the tenth aspect, or the first or the second possible implementation manner of the tenth aspect, in a third possible implementation manner, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

According to the third possible implementation manner of the tenth aspect, in a fourth possible implementation manner, s1 is greater than or equal to s2.

According to an eleventh aspect, an embodiment of the present invention provides a sending device, including: a transmitter, configured to send a reference signal to a receiving device; a receiver, configured to receive a precoding matrix indicator PMI sent by the receiving device; and a processor, configured to determine, according to the precoding matrix indicator PMI, a precoding matrix W selected by the receiving device from a codebook based on the reference signal, where the precoding matrix W is a product of a matrix W1 and a matrix W2, where the W1 includes $N_B$ block matrices $X_i$, $N_B \geq 1$, and the $W_1$ is indicated as: W1=diag$\{X_1, \ldots, X_{N_B}\}$, where $1 \leq i \leq N_B$, each block matrix $X_i$ is a Kronecker product of a first codebook $A_i$ and a second codebook $B_i$, that is, $X_i = A_i \otimes B_i$, each column of the first codebook $A_i$ is an M-dimensional discrete Fourier transform DFT vector, M>1, each column of the second codebook $B_i$ is an N-dimensional DFT vector, and N>1.

In a first possible implementation manner of the eleventh aspect, all phase differences between any two adjacent columns of DFT vectors in the first codebook $A_i$ are equal.

According to the first possible implementation manner of the eleventh aspect, in a second possible implementation manner, each column of the first codebook is selected at an equal interval from $N_a$ M-dimensional DFT vectors that are distributed at an equal interval within a phase range $[0, 2\pi]$, and $N_a > 1$.

According to the eleventh aspect, or the first or the second possible implementation manner of the eleventh aspect, in a third possible implementation manner, at least two phase differences between two adjacent columns of DFT vectors in the second codebook $B_i$ are not equal.

According to the third possible implementation manner of the eleventh aspect, in a fourth possible implementation manner, each column of the second codebook is selected from $N_e$ N-dimensional DFT vectors that are distributed at an unequal interval within a phase range $[0, \pi]$, and $N_e > 1$.

According to the eleventh aspect or any one of the first to the fourth possible implementation manners of the eleventh aspect, in a fifth possible implementation manner, a quantity of first codebooks is greater than or equal to a quantity of second codebooks.

According to the eleventh aspect or any one of the first to the fifth possible implementation manners of the eleventh aspect, in a sixth possible implementation manner, a phase difference between any two adjacent columns of DFT vectors in the second codebook $B_i$ is greater than or equal to a phase difference between any two adjacent columns of DFT vectors in the first codebook $A_i$.

According to the eleventh aspect or any one of the first to the sixth possible implementation manners of the eleventh aspect, in a seventh possible implementation manner, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

According to the eleventh aspect or any one of the first to the seventh possible implementation manners of the eleventh aspect, in an eighth possible implementation manner, the matrix W2 is used to select a column vector of the matrix W1 to constitute the matrix W, or is used to perform a weighted combination on column vectors of the matrix W1 to constitute the matrix W.

According to a twelfth aspect, an embodiment of the present invention provides a sending device, including: a transmitter, configured to send a reference signal to a receiving device; a receiver, configured to receive a precoding matrix indicator PMI sent by the receiving device; and a processor, configured to determine, according to the precoding matrix indicator PMI, a precoding matrix W selected by the receiving device from a codebook based on the reference signal, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \leq i \leq n-1$, n is a quantity of first precoding matrices that constitute the Wa, and n>1; and the Wb is a third precoding matrix, where Wb=Φ×Wa, and the Φ is a phase rotation matrix of the Wa.

In a first possible implementation manner of the twelfth aspect, the phase rotation matrix is a diagonal matrix $$\Phi = \begin{bmatrix} \varphi_0 & \cdots & 0 \\ \cdots & \cdots & \cdots \\ 0 & \cdots & \varphi_{n-1} \end{bmatrix},$$

and $\varphi_i = e^{j\theta_i}$, $\theta_i \in [0, 2\pi]$.

According to the twelfth aspect or the first possible implementation manner of the twelfth aspect, in a second possible implementation manner, each column of the first precoding matrix is a discrete Fourier transform DFT vector, or a column vector of a Hadamard matrix.

According to the twelfth aspect or the first possible implementation manner of the twelfth aspect, in a third possible implementation manner, the first precoding matrix is selected from a two-antenna codebook, a four-antenna codebook, or an eight-antenna codebook in a Long Term Evolution LTE system.

According to the method for determining a precoding matrix indicator, the receiving device, and the sending device that are provided in the embodiments of the present invention, for a codebook that includes a block matrix $X_i$ in a matrix W1, a column $x_{i,j}$ that is of each block matrix $X_i$ and represents a beam is defined in a form of a three-dimensional beam vector. Specifically, the column of the block matrix is obtained in a manner of calculating a Kronecker product of a first vector $A_{ij}$ that is corresponding to a phase in a horizontal direction and a second vector $B_{ij}$ that is corresponding to a phase in a vertical direction, which indicates that the phase in the horizontal direction and the phase in the vertical direction are combined, so that a characteristic of the three-dimensional beam vector can be reflected in the codebook. Therefore, a transmit end performs precoding based on a precoding matrix that is fed back by a receive end and is selected from a codebook structure in the present invention, which can effectively improve precoding precision, thereby reducing a performance loss and improving a system throughput.

According to the method for determining a precoding matrix indicator, the receiving device, and the sending device that are provided in the embodiments of the present invention, for a codebook that includes a block matrix $X_i$ in a matrix W1, a first codebook $A_i$ represents a codebook corresponding to a horizontal direction of a two-dimensional planar array antenna, a second codebook $B_i$ represents a codebook corresponding to a vertical direction of the two-dimensional planar array antenna, and selection of the first codebook $A_i$ and selection of the second codebook $B_i$ are mutually independent; therefore, a precoding matrix W can reflect a characteristic that characteristics of the horizontal direction and the vertical direction of the two-dimensional planar array antenna are mutually independent. Therefore, a transmit end performs precoding based on a precoding matrix that is fed back by a receive end and is selected from a codebook structure in the present invention, which can effectively improve precoding precision, thereby reducing a performance loss and improving a system throughput.

According to the method for determining a precoding matrix indicator, the receiving device, and the sending device that are provided in the embodiments of the present invention, a receive end selects a precoding matrix W from a codebook based on a reference signal, where $$W = \begin{bmatrix} Wa \\ Wb \end{bmatrix};$$

a structure in which the Wa and the Wb are connected in parallel is used, where the Wa and the Wb respectively represent characteristics of a first polarization direction and a second polarization direction, and the Wb is obtained by independently performing phase rotation on each row of the Wa, so that a characteristic that polarization phases in a horizontal direction and a vertical direction of a two-dimensional planar array antenna are mutually independent can be reflected, and a characteristic that phase rotation on each row in the vertical direction is independent can be reflected. Therefore, a transmit end performs precoding based on a precoding matrix that is fed back by the receive end and is constructed in a codebook structure in the present invention, which can effectively improve precoding precision, thereby reducing a performance loss and improving a system throughput.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a schematic structural diagram of a one-dimensional linear array antenna;

FIG. 2 is a schematic structural diagram of a two-dimensional planar array antenna;

FIG. 3 is a flowchart of Embodiment 1 of a method for determining a precoding matrix indicator according to the present invention;

DETAILED DESCRIPTION OF ILLUSTRATIVE EMBODIMENTS

Figure 4:
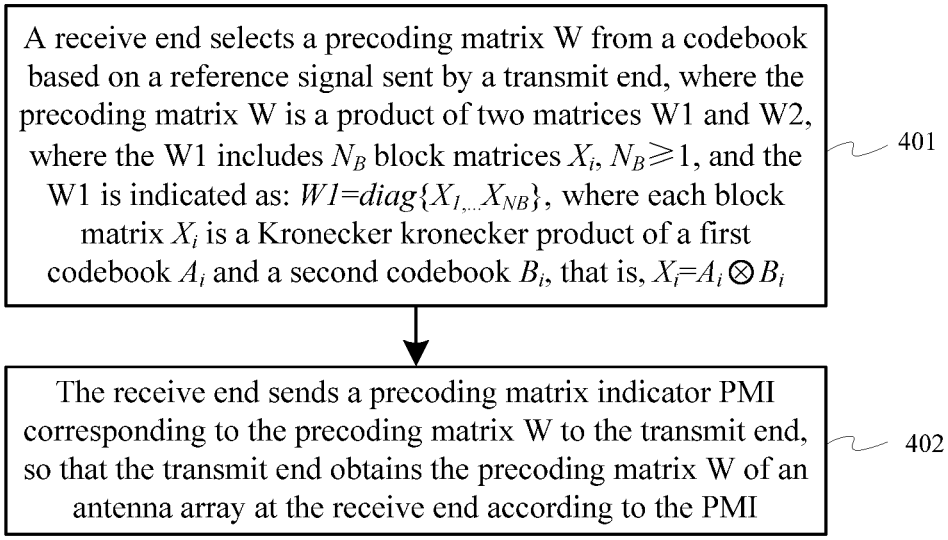
FIG. 4 is a flowchart of Embodiment 2 of a method for determining a precoding matrix indicator according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The technical solutions in the present invention may be applied to various communications system, for example: a Global System for Mobile Communications (GSM for short) system, a Code Division Multiple Access (CDMA for short) system, a Wideband Code Division Multiple Access (WCDMA for short) system, a general packet radio service (General Packet Radio Service, GPRS for short) system, a Long Term Evolution (LTE for short) system, a Long Term Evolution Advanced (LTE-A for short) system, and a Universal Mobile Telecommunications System (Universal Mobile Telecommunications System, UMTS for short).

In the embodiments of the present invention, user equipment (UE for short) includes but is not limited to a mobile station (MS for short), a relay, a mobile terminal, a mobile phone, a handset, portable equipment. The user equipment may communicate with one or more core networks by using a radio access network (RAN for short). For example, the user equipment may be a mobile phone (or referred to as a "cellular" phone), or a computer having a wireless communication function, or the user equipment may be a portable, pocket-sized, handheld, computer built-in, or vehicle-mounted mobile apparatus.

In the embodiments of the present invention, a base station may be a base station (BTS for short) in the GSM or CDMA, may be a base station NB for short) in the WCDMA, or may be an evolved NodeB (eNB or e-NodeB for short) in the LTE, or a relay, which is not limited in the present invention.

A multi-antenna system is a system in which communication is performed by a transmit end and a receive end by using multiple antennas, where when the transmit end is a base station, the receive end is a UE; on contrary, when the transmit end is a UE, the receive end is a base station. Compared with a single-antenna in a single-antenna system, the multiple antennas of the transmit end and the receive end can generate a spatial diversity gain or a spatial multiplexing gain, which can effectively improve transmission reliability and a system capacity. Generally, the diversity gain and the multiplexing gain in the multi-antenna system may be obtained by using a precoding method at the transmit end and a receive signal combination algorithm at the receive end.

The multi-antenna system in the embodiments of the present invention may be applied to a single-point transmission scenario, that is, a transmission scenario of one transmit end and one receive end; or may be applied to a scenario of joint transmission between multiple points, where joint transmission between multiple points means that joint transmission of a signal is performed by multiple transmit ends with a same receive end. For example, a transmit end A has two antennas, a transmit end B also has two antennas, and the two transmit ends perform joint transmission with one receive end at the same time. In this case, a signal received by the receive end may be considered as a signal sent by a four-antenna base station.

FIG. 3 is a flowchart of Embodiment 1 of a method for determining a precoding matrix indicator according to the present invention. An execution body of this embodiment is a receive end, which may be a base station or a UE. When the execution body, that is, the receive end, is a base station, correspondingly, a transmit end may be a UE; when the execution body, that is, the receive end, is a UE, correspondingly, the transmit end may be a base station. As shown in FIG. 3, the method in this embodiment may include the following steps:

Step 301: The receive end selects a precoding matrix W from a codebook based on a reference signal sent by the transmit end, where the precoding matrix W is a product of two matrices W1 and W2, where the W1 includes $N_B$ block matrices $X_i$, $N_B \geq 1$, and the W1 is indicated as: W1=diag$\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij} \otimes B_{ij}$.

Further, the matrix W1 may be a matrix that indicates a channel characteristic of a wideband, and the matrix W2 may be a matrix that indicates a channel characteristic of a sub-band; or the matrix W1 may be a matrix that indicates a long-term channel characteristic, and the matrix W2 may be a matrix that indicates a short-term channel characteristic.

The matrix W2 may be used to select a column vector of the matrix W1 to constitute the matrix W, or used to perform a weighted combination on column vectors of the matrix W1 to constitute the matrix W.

In this embodiment, the column $x_{i,j}$ of each block matrix $X_i$ in the W1 represents a three-dimensional beam vector, the $x_{i,j}$ is corresponding to a phase in three-dimensional space, and the phase is jointly indicated by a phase in a horizontal direction and a phase in a vertical direction. The first vector $A_{ij}$ is corresponding to a phase in a horizontal direction, the second vector $B_{ij}$ is corresponding to a phase in a vertical direction, and the direct product $x_{ij}=A_{ij} \otimes B_{ij}$ of the first vector $A_{ij}$ and the second vector $B_{ij}$ is corresponding to a phase that is in three-dimensional space and that is obtained by combining the phase in the horizontal direction and the phase in the vertical direction.

Specifically, in step 301, the first vector $A_{ij}$ may be a discrete Fourier transform (Discrete Fourier Transform, DFT for short) vector, or referred to as a DFT vector, in a first codebook $A_i$ corresponding to a horizontal direction that is corresponding to a two-dimensional planar array antenna, and the second vector $B_{ij}$ may be a DFT vector in a second codebook $B_i$ corresponding to a vertical direction that is corresponding to the two-dimensional planar array antenna. The first codebook and the second codebook may be selected from existing codebooks or may be re-constructed. For example, for 4×2 two-dimensional planar array antennas, it may be considered that there are four antennas in a horizontal direction, and there are two antennas in a vertical direction; therefore, the first codebook $A_i$ may be selected from a four-antenna codebook of LTE, and the second codebook $B_i$ may be selected from a two-antenna codebook of LTE, or forms of the first codebook $A_i$ and the second codebook $B_i$ may be separately defined in another manner.

Step 302: The receive end sends a precoding matrix indicator PMI corresponding to the precoding matrix W to the transmit end.

Accordingly, the transmit end may obtain the precoding matrix W of an antenna array at the receive end according to the PMI and according to a relationship that is specified in 3GPP and is between a PMI and a precoding matrix.

It should be noted that a type of the reference signal in step 301 is not limited in this embodiment of the present invention. For example, the reference signal may be a channel state information-reference signal (Channel State Information Reference Signal, CSI RS), a demodulation reference signal (Demodulation Reference Signal, DMRS), or a cell-specific reference signal (Cell-specific RS, CRS), and CSI may further include a channel quality indicator (Channel Quality Indicator, CQI for short). It should be further noted that by receiving a notification, such as radio resource control (Radio Resource Control, RRC) signaling or downlink control information (Downlink Control Information, DCI), of the base station or based on a cell identity ID, the UE may obtain a resource configuration of the reference signal and obtain the reference signal on a corresponding resource or in a corresponding subframe.

In this embodiment, in step 301, for a codebook that includes a block matrix $X_i$ in a matrix W1, a column $x_{i,j}$ that is of each block matrix $X_i$ and represents a beam is defined in a form of a three-dimensional beam vector. Specifically, the column of the block matrix is obtained in a manner of calculating a Kronecker product of a first vector $A_{ij}$ that is corresponding to a phase in a horizontal direction and a second vector $B_{ij}$ that is corresponding to a phase in a vertical direction, which indicates that the phase in the horizontal direction and the phase in the vertical direction are combined, so that a characteristic of the three-dimensional beam vector can be reflected in the codebook. Therefore, a transmit end performs precoding based on a precoding matrix that is fed back by a receive end and is selected from a codebook structure in the present invention, which can effectively improve precoding precision, thereby reducing a performance loss and improving a system throughput.

In the foregoing embodiment, in specific implementation, further, specifically, all columns of the block matrix $X_i$ are obtained by pairwisely successively calculating Kronecker products of N1 consecutive first vectors and N2 consecutive second vectors. For example, the first vector is from the first codebook $A_i$ and there are four first vectors in the first codebook: $A_{i,0}$, $A_{i,1}$, $A_{i,2}$, and $A_{i,3}$; the second vector is from the second codebook $B_i$, and there are four second vectors in the second codebook: $B_{i,0}$, $B_{i,1}$, $B_{i,2}$, and $B_{i,3}$; in this case, four columns $x_{i,0}$, $x_{i,1}$, $x_{i,2}$, and $x_{i,3}$ included in the block matrix $X_i$ are respectively: $x_{i0}=A_{i0}\otimes B_{i0}$, $x_{i1}=A_{i1}\otimes B_{i1}$, $X_{i2}=A_{i2}\otimes B_{i2}$, and $x_{i3}=A_{i3}\otimes B_{i3}$.

Still further, in the foregoing embodiment, a quantity N1 of first vectors is greater than or equal to a quantity N2 of second vectors. A range of the phase in the horizontal direction generally is [0, 2π], a range of the phase in the vertical direction is [0, π], and a change of a channel in a vertical direction is slower than a change of a channel in a horizontal direction; therefore, a phase division granularity of the second codebook that represents a vertical direction may be made greater than a phase division granularity of the first codebook that represents a horizontal direction, that is, the quantity N2 of second vectors in the second codebook may be less than or equal to the quantity N1 of first vectors in the first codebook.

Further, all beam vectors of a three-dimensional beam vector matrix may be further divided into multiple beam groups of which adjacent beam groups overlap with each other or do not overlap with each other. That is, in the foregoing embodiment, each block matrix $X_i$ is corresponding to one beam group, and the beam group may be divided in multiple manners.

Specifically, for any two adjacent block matrices $X_i$ and $X_{i+1}$, if second vectors that constitute the $X_i$ and the $X_{i+1}$ are N2 consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0, where s1 represents a quantity of overlapped beam groups in a horizontal direction, and when s1 is equal to 0, beam groups do not overlap in the horizontal direction; s2 represents a quantity of overlapped beam groups in a vertical direction, and when s2 is equal to 0, beam groups do not overlap in the vertical direction; both s1 and s2 may be 0, which is corresponding to a case in which there are no overlapped beam groups at all; neither s1 nor s2 may be 0, which is corresponding to a case in which there are overlapped beam groups in both a horizontal direction and a vertical direction.

Preferably, to ensure selection accuracy of an edge beam within each beam vector group, adjacent beam vector groups generally overlap to a particular degree, that is, either s1 or s2 is 0.

Further, preferably, s1 is greater than or equal to s2. In this case, fewer beam groups may be used in the vertical direction, and therefore, feedback overheads in the vertical direction and the entire three-dimensional space are reduced.

FIG. 4 is a flowchart of Embodiment 2 of a method for determining a precoding matrix indicator according to the present invention. An execution body of this embodiment is a receive end, which may be a base station or a UE. When the execution body, that is, the receive end, is a base station, correspondingly, a transmit end may be a UE; when the execution body, that is, the receive end, is a UE, correspondingly, the transmit end may be a base station. As shown in FIG. 4, the method in this embodiment may include the following steps:

Step 401: The receive end selects a precoding matrix W from a codebook based on a reference signal sent by the transmit end, where the precoding matrix W is a product of a matrix W1 and a matrix W2, where the W1 includes $N_B$ block matrices $X_i$, $N_B \geq 1$, and the $W_1$ is indicated as:

W1=diag{$X_1, \ldots, X_{N_B}$}, where $1 \leq i \leq N_B$, and each block matrix $X_i$ is a Kronecker product of a first codebook $A_i$ and a second codebook $B_i$, that is, $x_i = A_i \otimes B_i$.

Further, the matrix W1 may be a matrix that indicates a channel characteristic of a wideband, and the matrix W2 may be a matrix that indicates a channel characteristic of a sub-band; or the matrix W1 may be a matrix that indicates a long-term channel characteristic, and the matrix W2 may be a matrix that indicates a short-term channel characteristic.

The matrix W2 may be used to select a column vector of the matrix W1 to constitute the matrix W, or used to perform a weighted combination on column vectors of the matrix W1 to constitute the matrix W.

$N_B$ may be a quantity of polarization directions, or may be a quantity of any other antenna groups.

In this embodiment, the first codebook $A_i$ in the block matrix Xi in the W1 may be a DFT vector or matrix in a horizontal direction, the second codebook $B_i$ is a DFT vector or matrix in a vertical direction, and the block matrix Xi in the matrix W1 is a direct product of the first codebook and the second codebook, or the block matrix $X_i$ in the W1 is in a form of a DFT vector in three-dimensional space (a 3D DFT vector) or a DFT matrix in three-dimensional space. Each DFT vector or matrix in a horizontal direction, each DFT vector or matrix in a vertical direction, and each 3D DFT vector or matrix are respectively corresponding to one phase in a horizontal direction, one phase in a vertical direction, and one phase in a 3D direction. For example, in an eight-antenna dual-index codebook in 3GPP Release 10 (Rel-10), 32 four-antenna DFT vectors in a horizontal direction are corresponding to 32 phases that are evenly divided within a range [0, $2\pi$].

Specifically, in step 401, for the block matrix $X_i$ in the matrix W1, the first codebook $A_i$ represents a codebook corresponding to a horizontal direction of a two-dimensional planar array antenna, and the second codebook $B_i$ represents a codebook corresponding to a vertical direction of the two-dimensional planar array antenna. For example, for 4×2 two-dimensional planar array antennas, it may be considered that there are four antennas in a horizontal direction, and there are two antennas in a vertical direction; therefore, the first codebook $A_i$ may be selected from a four-antenna codebook of LTE, and the second codebook $B_i$ may be selected from a two-antenna codebook of LTE, or forms of the first codebook $A_i$ and the second codebook $B_i$ may be separately defined in another manner.

Step 402: The receive end sends a precoding matrix indicator PMI corresponding to the precoding matrix W to the transmit end, so that the transmit end obtains the precoding matrix W of an antenna array at the receive end according to the PMI.

It should be noted that a type of the reference signal in step 401 is not limited in this embodiment of the present invention. For example, the reference signal may be a channel state information-reference signal (Channel State Information Reference Signal, CSI RS), a demodulation reference signal (Demodulation RS, DM RS), or a cell-specific reference signal (Cell-specific RS, CRS), and CSI may further include a channel quality indicator (Channel Quality Indicator/Index, CQI for short). It should be further noted that by receiving a notification (such as radio resource control (Radio Resource Control, RRC) signaling or downlink control information (Downlink Control Information, DCI)) of the base station or based on a cell identity ID, the UE may obtain a resource configuration of the reference signal and obtain the reference signal on a corresponding resource or in a corresponding subframe.

In this embodiment, in step 401, for a codebook that includes a block matrix $X_i$ in a matrix W1, a first codebook $A_i$ represents a codebook corresponding to a horizontal direction of a two-dimensional planar array antenna, a second codebook $B_i$ represents a codebook corresponding to a vertical direction of the two-dimensional planar array antenna, and selection of the first codebook $A_i$ and selection of the second codebook $B_i$ are mutually independent; therefore, a precoding matrix W in this embodiment can reflect a characteristic that characteristics of the horizontal direction and the vertical direction of the two-dimensional planar array antenna are mutually independent. Therefore, a transmit end performs precoding based on a precoding matrix that is fed back by a receive end and is selected from a codebook structure in the present invention, which can effectively improve precoding precision, thereby reducing a performance loss and improving a system throughput.

In specific implementation of the foregoing embodiment, considering that a change of a channel in a vertical direction is slower than a change of a channel in a horizontal direction, where the change of the channel herein refers to a change of a channel response in a time domain, a frequency domain or a space domain, different quantization methods may be used in a horizontal direction and a vertical direction. In the different quantization methods, quantization granularities or quantization ranges are different, that is, different quantization methods are used for the first codebook $A_i$ and the second codebook $B_i$. The different quantization methods specifically include three manners. In a first manner, a quantization granularity of the first codebook $A_i$ is less than a quantization granularity of the second codebook $B_i$, for example, the quantization granularity of the first codebook is $\pi/32$, that is, a phase corresponding to each vector in space in which vectors constitute the first codebook is an integer multiple of $\pi/32$, and the quantization granularity of the second codebook is $\pi/16$, that is, a phase corresponding to each vector in space in which vectors constitute the second codebook is an integer multiple of $\pi/16$. In a second manner, all phase differences between any two adjacent vectors in space in which vectors constitute the first codebook $A_i$ are equal, that is, the first codebook $A_i$ is an evenly quantized codebook, and at least two phase differences in space in which vectors constitute the second codebook $B_i$ are not equal, where each phase difference is a phase difference between two adjacent vectors in the constituent vector space, that is, the second codebook $B_i$ is an unevenly quantized codebook; for example, a phase difference between any two adjacent vectors in the space in which the vectors constitute the first codebook $A_i$ is $\pi/32$, and in the space in which the vectors constitute the second codebook $B_i$, a phase difference between the first vector and the adjacent second vector is $\pi/24$, and a phase difference between the $22^{nd}$ vector and the adjacent $23^{rd}$ vector is $\pi/28$. In a third manner, for example, the first codebook $A_i$ uses an evenly quantized codebook, that is, all phase differences between any two adjacent code words in the codebook are equal, and the second codebook $B_i$ uses an unevenly quantized codebook, that is, all phase differences between any two adjacent code words in the codebook are not equal; or a codebook in which any two adjacent code words have a smaller phase difference may be used as the first codebook $A_i$, and a codebook in which any two adjacent code words have a larger phase difference may be used as the second codebook $B_i$, that is, the quantization granularity of the first codebook $A_i$ is made less than that of the second codebook $B_i$.

In one implementation manner, each column of the first codebook $A_i$ is an M-dimensional discrete Fourier transform DFT vector, where M may be corresponding to a quantity of transmit antennas in a horizontal direction, M>1, and all phase differences between any two adjacent columns of DFT vectors are equal.

Each column of the second codebook $B_i$ is an N-dimensional DFT vector, where N may be corresponding to a quantity of transmit antennas in a vertical direction, N>1, and at least two phase differences between two adjacent columns of DFT vectors are not equal.

More specifically, each column of the first codebook $A_i$ may be selected at an equal interval from $N_a$ M-dimensional DFT vectors that are distributed at an equal interval within a phase range [0, 2π], and $N_a$>1. Each column of the second codebook may be selected from $N_e$ N-dimensional DFT vectors that are distributed at an unequal interval within a phase range [0, π], and $N_e$>1.

In other words, there are $N_a$ DFT vectors in a horizontal direction, and there are $N_e$ DFT vectors in a vertical direction; in this case, a phase corresponding to each DFT vector in a horizontal direction is one of $N_a$ phases that are divided in the range [0, 2π], and a phase corresponding to each DFT vector in a vertical direction is one of $N_e$ phases that are divided in the range [0, π]. It should be noted that the phase range [0, 2π] in the horizontal direction and the phase range [0, π] in the vertical direction are only examples. In the following description, the ranges in the examples are also used, but another phase range may be used in specific implementation.

According to characteristics of the channel in the horizontal direction and the channel in the vertical direction, it may be specified that the phase range [0, 2π] in the horizontal direction is evenly divided, and the phase range [0, π] in the vertical direction is unevenly divided, that is, it may be specified that all differences between any two adjacent phases of $N_a$ phases are the same, and all differences between any two adjacent phases of $N_e$ phases are not the same. For example, some DFT vectors in the vertical direction are corresponding to $(2N_e/3)$ phases that are evenly divided in a range [0, π/2], and the other DFT vectors are corresponding to $(N_e/3)$ phases that are evenly divided in a range [π/2, π]. That is, by using π/2 as a center, the phases corresponding to the DFT vectors in the vertical direction are respectively selected upward or downward by a granularity k or a granularity d. Herein, the granularity k for upward selection is greater than or equal to the granularity d for downward selection.

In another implementation manner, because the change of the channel in the vertical direction is slower than the change of the channel in the horizontal direction, a quantity of candidate codebooks of the first codebook may be made greater than or equal to a quantity of candidate codebooks of the second codebook. Specifically, for example, a quantity of block matrices $X_i$ in the W1 is $N_B$, and a quantity of first codebooks $A_i$ and a quantity of second codebooks $B_i$ may also be $N_B$. However, in this implementation manner, because the change of the channel in the vertical direction is slower than the change of the channel in the horizontal direction, a quantity of second codebooks $B_i$ may be made less than $N_B$. For example, the quantity of second codebooks $B_i$ is $N_B/2$, and when being used, each second codebook $B_i$ is used twice, and constituted block matrices are respectively as follows: $X_1=A_1 \otimes B_1$, $X_2=A_2 \otimes B_1$, $X_3=A_3 \otimes B_2$, $X_4=A_4 \otimes B_2$, ..., and $X_{N_B}=A_{N_B} \otimes B_{N_B/2}$.

In this manner, the quantity of second codebooks $B_i$ is smaller, and therefore, feedback overheads of a network can be reduced.

Still further, in another implementation manner, a phase difference between any two adjacent columns of DFT vectors in the second codebook $B_i$ is greater than or equal to a phase difference between any two adjacent columns of DFT vectors in the first codebook $A_i$. That is, a phase interval between DFT vectors in the second codebook $B_i$ is greater than a phase interval between DFT vectors in the first codebook $A_i$, that is, the DFT vectors in the second codebook $B_i$ are sparser. Therefore, a characteristic that the change of the channel in the vertical direction is slower than the change of the channel in the horizontal direction can also be reflected.

Figure 5:
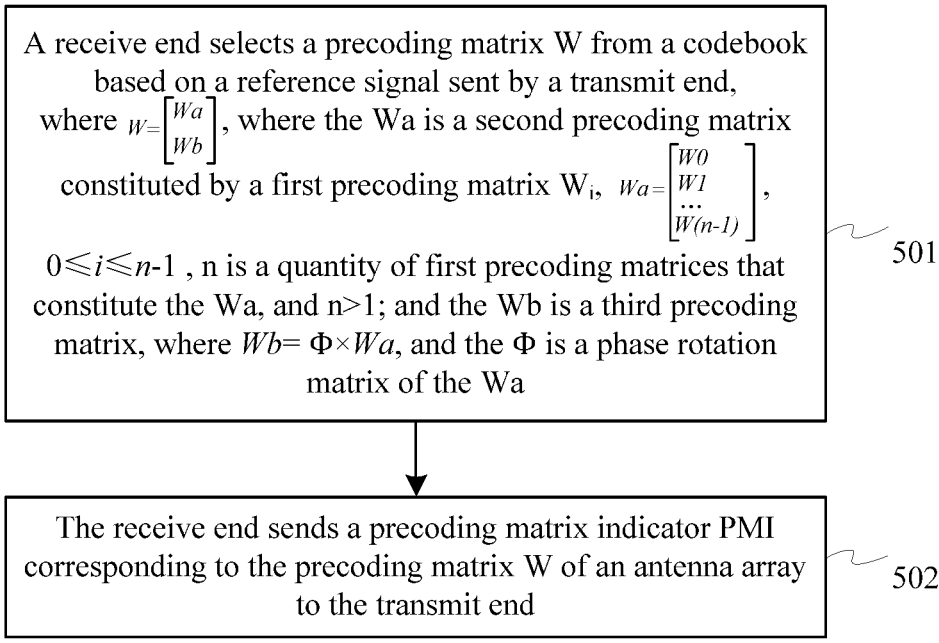
FIG. 5 is a flowchart of Embodiment 3 of a method for determining a precoding matrix indicator according to the present invention.

FIG. 5 is a flowchart of Embodiment 3 of a method for determining a precoding matrix indicator according to the present invention. An execution body of this embodiment is a receive end, which may be a base station or a UE. When the execution body, that is, the receive end, is a base station, correspondingly, a transmit end may be a UE; when the execution body, that is, the receive end, is a UE, correspondingly, the transmit end may be a base station. As shown in FIG. 5, the method in this embodiment may include the following steps:

Step 501: The receive end selects a precoding matrix W from a codebook based on a reference signal sent by the transmit end, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

0≤i≤n−1, n is a quantity of first precoding matrices that constitute the Wa, and n>1; and the Wb is a third precoding matrix, where Wb=Φ×Wa, and the Φ is a phase rotation matrix of the Wa.

Specifically, for a two-dimensional planar array of a dual-polarized antenna (that is, a two-dimensional antenna planar array includes at least two polarization directions, for example, the two polarization directions may be positive 45 degrees and negative 45 degrees or 0 degrees and 90 degrees), the second precoding matrix Wa may represent a precoding matrix in a first polarization direction, where n may be a quantity of antenna ports in a vertical direction, that is, a quantity of rows of two-dimensional planar array antennas, and the third precoding matrix Wb may represent a precoding matrix in a second polarization direction.

Selection of the second precoding matrix Wa may be as follows: For example, for 2×4 two-dimensional planar array antennas, that is, there are two rows of the antennas, and there are four antennas in each row, the Wa may be:

$$Wa = \begin{bmatrix} W0 \\ W1 \end{bmatrix}.$$

and the W0 and the W1 may be separately selected from a four-antenna codebook in an LTE system, where the W0 and the W1 may be selected as same codebooks, or may be selected as different codebooks, which is not limited in this embodiment of the present invention.

Because it may be considered that the precoding matrix in the second polarization direction may be obtained by rotating the precoding matrix in the first polarization direction by a specific phase, and characteristics of polarization phase rotation corresponding to each row of antennas in a vertical direction are mutually independent, the third precoding matrix Wb may be obtained by multiplying the second precoding matrix Wa by the phase rotation matrix Φ. Specifically, the third precoding matrix Wb may be indicated as:

$$Wb = \Phi \times Wa = \Phi \times \begin{bmatrix} W0 \\ W1 \\ \ldots \\ W(n-1) \end{bmatrix},$$

in this case, the third precoding matrix Wb can reflect a characteristic that phase rotation is independently performed on each row of two-dimensional planar array antennas corresponding to the second precoding matrix Wa.

Step 502: The receive end sends a precoding matrix indicator PMI corresponding to the precoding matrix W to the transmit end.

Accordingly, after receiving the PMI, the transmit end may obtain the precoding matrix W according to the PMI and according to a correspondence that is in the 3GPP TS 36.213 and is between a PMI and a precoding matrix W.

In this embodiment, a receive end selects a precoding matrix W from a codebook based on a reference signal, where $$W = \begin{bmatrix} Wa \\ Wb \end{bmatrix};$$

a structure in which the Wa and the Wb are connected in parallel is used, where the Wa and the Wb respectively represent characteristics of a first polarization direction and a second polarization direction, and the Wb is obtained by independently performing phase rotation on each row of the Wa, so that a characteristic that polarization phases in a horizontal direction and a vertical direction of a two-dimensional planar array antenna are mutually independent can be reflected, and a characteristic that phase rotation on each row in the vertical direction is independent can be reflected. Therefore, a transmit end performs precoding based on a precoding matrix that is fed back by the receive end and is constructed in a codebook structure in the present invention, which can effectively improve precoding precision, thereby reducing a performance loss and improving a system throughput.

For ease of description, the following embodiment is described by using an example in which the transmit end is a base station and the receive end is a UE. It should be understood that this embodiment of the present invention sets no limitation thereto. The receive end may be a base station and the transmit end may be a UE.

It should be noted that a type of the reference signal in step 501 is not limited in this embodiment of the present invention. For example, the reference signal may be a channel state information-reference signal (Channel State Information Reference Signal, CSI RS), a demodulation reference signal (Demodulation RS, DM RS), or a cell-specific reference signal (Cell-specific RS, CRS), and CSI may further include a channel quality indicator (Channel Quality Indicator/Index, CQI for short). It should be further noted that by receiving a notification (such as radio resource control (Radio Resource Control, RRC) signaling or downlink control information (Downlink Control Information, DCI)) of the base station or based on a cell identity ID, the UE may obtain a resource configuration of the reference signal and obtain the reference signal on a corresponding resource or in a corresponding subframe.

Further, in step 501 in the foregoing embodiment, the phase rotation matrix Φ may be a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

where n>1, and $\varphi_i = e^{j\theta_i}$, $\theta_i \in [0, 2\pi]$. A specific value of $\theta_i$ may be preset. For example, the value of $\theta_i$ may be selected from a phase corresponding to any constellation point in an existing modulation manner in the LTE Long Term Evolution system, where the modulation manner may be quadrature phase shift keying (Quadrature Phase Shift Keying, QPSK for short), 8 phase shift keying (8 Phase Shift Keying, 8PSK for short), 16 phase quadrature amplitude modulation (16 Quadrature Amplitude Modulation, 16QAM for short), or the like. For example, for the QPSK, phases corresponding to four constellation points are respectively {0, π/2, π, 3π/2}.

Specifically, each column of the first precoding matrix $W_i$ may be a discrete Fourier transform (Discrete Fourier Transform, DFT for short) vector, or may be a column vector of a Hadamard matrix.

Specifically, the first precoding matrix $W_i$ may be selected from a two-antenna codebook, a four-antenna codebook, or an eight-antenna codebook in the Long Term Evolution LTE system.

Figure 6:
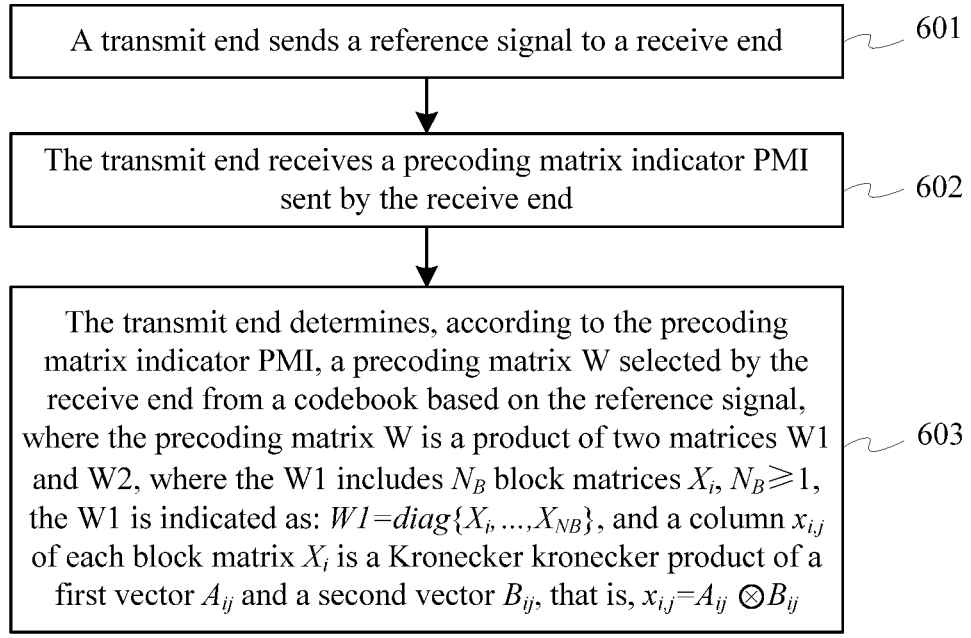
FIG. 6 is a flowchart of Embodiment 1 of a method for determining a precoding matrix according to the present invention.

FIG. 6 is a flowchart of Embodiment 1 of a method for determining a precoding matrix according to the present invention. An execution body of this embodiment is a transmit end, which may be a base station or a UE. When the execution body, that is, the transmit end, is a base station, correspondingly, a receive end may be a UE; when the execution body, that is, the transmit end, is a UE, correspondingly, the receive end may be a base station. The method for determining a precoding matrix in this embodiment is corresponding to Embodiment 1 of the method for determining a precoding matrix indicator shown in FIG. 3. As shown in FIG. 6, the method in this embodiment may include the following steps:

Step 601: The transmit end sends a reference signal to the receive end.

It should be noted that a type of the reference signal in step 601 is not limited in this embodiment of the present invention. For example, the reference signal may be a channel state information-reference signal (Channel State Information Reference Signal, CSI RS), a demodulation reference signal (Demodulation RS, DM RS), or a cell-specific reference signal (Cell-specific RS, CRS), and CSI may further include a channel quality indicator (Channel Quality Indicator/Index, CQI for short). It should be further noted that by receiving a notification (such as radio resource control (Radio Resource Control, RRC) signaling or downlink control information (Downlink Control Information, DCI)) of the base station or based on a cell identity ID, the UE may obtain a resource configuration of the reference signal and obtain the reference signal on a corresponding resource or in a corresponding subframe.

Step 602: The transmit end receives a precoding matrix indicator PMI sent by the receive end.

Step 603: The transmit end determines, according to the precoding matrix indicator PMI, a precoding matrix W selected by the receive end from a codebook based on the reference signal, where the precoding matrix W is a product of two matrices W1 and W2, where the W1 includes $N_B$ block matrices $X_i$, $N_B \geq 1$, and the $W_1$ is indicated as: W1=diag$\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij} \otimes B_{ij}$.

Specifically, the transmit end may obtain the precoding matrix W of an antenna array at the receive end according to the PMI and according to a relationship that is specified in 3GPP and is between a PMI and a precoding matrix.

Further, the matrix W1 may be a matrix that indicates a channel characteristic of a wideband, and the matrix W2 may be a matrix that indicates a channel characteristic of a sub-band; or the matrix W1 may be a matrix that indicates a long-term channel characteristic, and the matrix W2 may be a matrix that indicates a short-term channel characteristic.

The matrix W2 may be used to select a column vector of the matrix W1 to constitute the matrix W, or used to perform a weighted combination on column vectors of the matrix W1 to constitute the matrix W.

In this embodiment, the column $x_{i,j}$ of each block matrix $X_i$ in the W1 represents a three-dimensional beam vector, the $x_{i,j}$ is corresponding to a phase in three-dimensional space, and the phase is jointly indicated by a phase in a horizontal direction and a phase in a vertical direction. The first vector $A_{ij}$ is corresponding to a phase in a horizontal direction, the second vector $B_{ij}$ is corresponding to a phase in a vertical direction, and the direct product $x_{ij}=A_{ij} \otimes B_{ij}$ of the first vector Aij and the second vector Bij is corresponding to a phase that is in three-dimensional space and that is obtained by combining the phase in the horizontal direction and the phase in the vertical direction.

Specifically, in step 603, the first vector $A_{ij}$ may be a DFT vector in a first codebook $A_i$ corresponding to a horizontal direction that is corresponding to a two-dimensional planar array antenna, and the second vector $B_{ij}$ may be a DFT vector in a second codebook $B_i$ corresponding to a vertical direction that is corresponding to the two-dimensional planar array antenna. The first codebook and the second codebook may be selected from existing codebooks or may be re-constructed. For example, for 4×2 two-dimensional planar array antennas, it may be considered that there are four antennas in a horizontal direction, and there are two antennas in a vertical direction; therefore, the first codebook $A_i$ may be selected from a four-antenna codebook of LTE, and the second codebook $B_i$ may be selected from a two-antenna codebook of LTE, or forms of the first codebook $A_i$ and the second codebook $B_i$ may be separately defined in another manner.

In this embodiment, for a codebook that includes a block matrix $X_i$ in a matrix W1, a column $x_{i,j}$ that is of each block matrix $X_i$ and represents a beam is defined in a form of a three-dimensional beam vector. Specifically, the column of the block matrix is obtained in a manner of calculating a Kronecker product of a first vector $A_{ij}$ that is corresponding to a phase in a horizontal direction and a second vector $B_{ij}$ that is corresponding to a phase in a vertical direction, which indicates that the phase in the horizontal direction and the phase in the vertical direction are combined, so that a characteristic of the three-dimensional beam vector can be reflected in the codebook. Therefore, a transmit end performs precoding based on a precoding matrix that is fed back by a receive end and is selected from a codebook structure in the present invention, which can effectively improve precoding precision, thereby reducing a performance loss and improving a system throughput.

In the foregoing embodiment, in specific implementation, further, specifically, all columns of the block matrix $X_i$ are obtained by pairwisely successively calculating Kronecker products of N1 consecutive first vectors and N2 consecutive second vectors. For example, the first vector is from the first codebook $A_i$ and there are four first vectors in the first codebook: $A_{i,0}, A_{i,1}, A_{i,2}$, and $A_{i,3}$; the second vector is from the second codebook $B_i$, and there are four second vectors in the second codebook: $B_{i,0}, B_{i,1}, B_{i,2}$, and $B_{i,3}$; in this case, four columns $x_{i,0}, x_{i,1}, x_{i,2}$, and $x_{i,3}$ included in the block matrix $X_i$ are respectively: $x_{i0}=A_{i0} \otimes B_{i0}$, $x_{i1}=A_{i1} \otimes B_{i1}$, $x_{i2}=A_{i2} \otimes B_{i2}$, and $x_{i3}=A_{i3} \otimes B_{i3}$.

Still further, in the foregoing embodiment, a quantity N1 of first vectors is greater than or equal to a quantity N2 of second vectors. A range of the phase in the horizontal direction generally is $[0, 2\pi]$, a range of the phase in the vertical direction is $[0, \pi]$, and a change of a channel in a vertical direction is slower than a change of a channel in a horizontal direction; therefore, a phase division granularity of the second codebook that represents a vertical direction may be made greater than a phase division granularity of the first codebook that represents a horizontal direction, that is, the quantity N2 of second vectors in the second codebook may be less than or equal to the quantity N1 of first vectors in the first codebook.

Further, all beam vectors of a three-dimensional beam vector matrix may be further divided into multiple beam groups of which adjacent beam groups overlap with each other or do not overlap with each other. That is, in the foregoing embodiment, each block matrix $X_i$ is corresponding to one beam group, and the beam group may be divided in multiple manners.

Specifically, for any two adjacent block matrices $X_i$ and $X_{i+1}$, if second vectors that constitute the $X_i$ and the $X_{i+1}$ are N2 consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0, where s1 represents a quantity of overlapped beam groups in a horizontal direction, and when s1 is equal to 0, beam groups do not overlap in the horizontal direction; s2 represents a quantity of overlapped beam groups in a vertical direction, and when s2 is equal to 0, beam groups do not overlap in the vertical direction; both s1 and s2 may be 0, which is corresponding to a case in which there are no overlapped beam groups at all; neither s1 nor s2 may be 0, which is corresponding to a case in which there are overlapped beam groups in both a horizontal direction and a vertical direction.

Preferably, to ensure selection accuracy of an edge beam within each beam vector group, adjacent beam vector groups generally overlap to a particular degree, that is, either s1 or s2 is 0.

Further, preferably, s1 is greater than or equal to s2. In this case, fewer beam groups may be used in the vertical direction, and therefore, feedback overheads in the vertical direction and the entire three-dimensional space are reduced.

Figure 7:
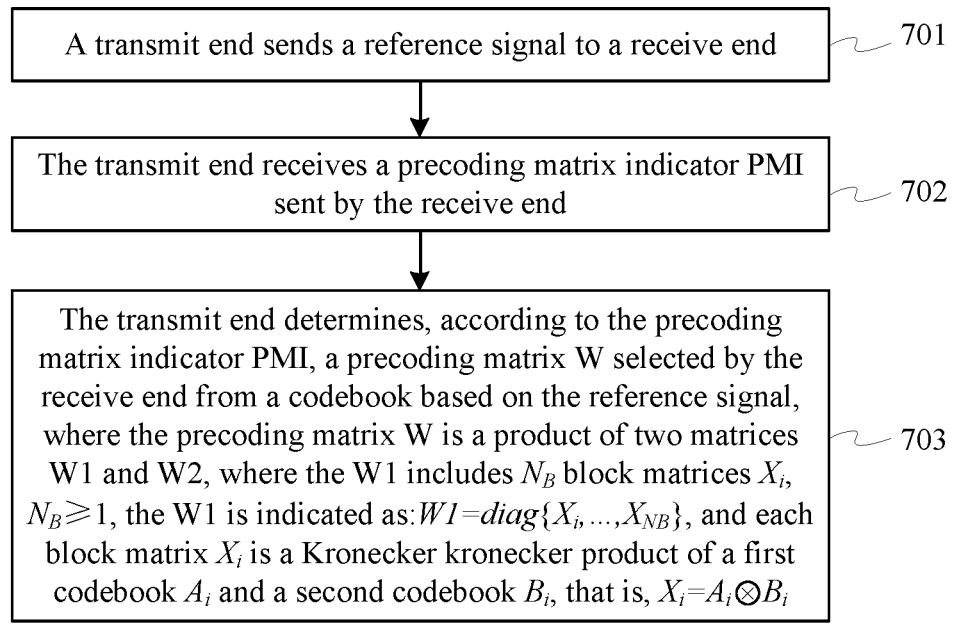
FIG. 7 is a flowchart of Embodiment 2 of a method for determining a precoding matrix according to the present invention.

FIG. 7 is a flowchart of Embodiment 2 of a method for determining a precoding matrix according to the present invention. An execution body of this embodiment is a transmit end, which may be a base station or a UE. When the execution body, that is, the transmit end, is a base station, correspondingly, a receive end may be a UE; when the execution body, that is, the transmit end, is a UE, correspondingly, the receive end may be a base station. The method for determining a precoding matrix in this embodiment is corresponding to Embodiment 2 of the method for determining a precoding matrix indicator shown in FIG. 4. As shown in FIG. 7, the method in this embodiment may include the following steps:

Step 701: The transmit end sends a reference signal to the receive end.

It should be noted that a type of the reference signal in step 701 is not limited in this embodiment of the present invention. For example, the reference signal may be a channel state information-reference signal (Channel State Information Reference Signal, CSI RS), a demodulation reference signal (Demodulation RS, DM RS), or a cell-specific reference signal (Cell-specific RS, CRS), and CSI may further include a channel quality indicator (Channel Quality Indicator/Index, CQI for short). It should be further noted that by receiving a notification (such as radio resource control (Radio Resource Control, RRC) signaling or downlink control information (Downlink Control Information, DCI)) of the base station or based on a cell identity ID, the UE may obtain a resource configuration of the reference signal and obtain the reference signal on a corresponding resource or in a corresponding subframe.

Step 702: The transmit end receives a precoding matrix indicator PMI sent by the receive end.

Step 703: The transmit end determines, according to the precoding matrix indicator PMI, a precoding matrix W selected by the receive end from a codebook based on the reference signal, where the precoding matrix W is a product of a matrix W1 and a matrix W2, where the W1 includes $N_B$ block matrices $X_i$, $N_B \geq 1$, and the W1 is indicated as: W1=diag$\{X_1, \ldots, X_{N_B}\}$, where $1 \leq i \leq N_B$, each block matrix $X_i$ is a Kronecker product of a first codebook $A_i$ and a second codebook $B_i$, that is, $X_i = A_i \otimes B_i$, each column of the first codebook $A_i$ is an M-dimensional discrete Fourier transform DFT vector, M>1, each column of the second codebook $B_i$ is an N-dimensional DFT vector, and N>1.

Further, the matrix W1 may be a matrix that indicates a channel characteristic of a wideband, and the matrix W2 may be a matrix that indicates a channel characteristic of a sub-band; or the matrix W1 may be a matrix that indicates a long-term channel characteristic, and the matrix W2 may be a matrix that indicates a short-term channel characteristic.

The matrix W2 may be used to select a column vector of the matrix W1 to constitute the matrix W, or used to perform a weighted combination on column vectors of the matrix W1 to constitute the matrix W.

In this embodiment, the first codebook $A_i$ in the block matrix Xi in the W1 may be a DFT vector or matrix in a horizontal direction, the second codebook $B_i$ is a DFT vector or matrix in a vertical direction, and the block matrix Xi in the matrix W1 is a direct product of the first codebook and the second codebook, or the codebook generated in the W1 is in a form of a DFT vector in three-dimensional space (a 3D DFT vector) or a DFT matrix in three-dimensional space.

Each DFT vector or matrix in a horizontal direction, each DFT vector or matrix in a vertical direction, and each 3D DFT vector or matrix are respectively corresponding to one phase in a horizontal direction, one phase in a vertical direction, and one phase in a 3D direction. For example, in an eight-antenna dual-index codebook in 3GPP Release 10 (Rel-10), 32 four-antenna DFT vectors in a horizontal direction are corresponding to 32 phases that are evenly divided within a range [0, $2\pi$].

Specifically, in step 703, for the block matrix $X_i$ in the matrix W1, the first codebook $A_i$ represents a codebook corresponding to a horizontal direction of a two-dimensional planar array antenna, and the second codebook $B_i$ represents a codebook corresponding to a vertical direction of the two-dimensional planar array antenna. For example, for 4×2 two-dimensional planar array antennas, it may be considered that there are four antennas in a horizontal direction, and there are two antennas in a vertical direction; therefore, the first codebook $A_i$ may be selected from a four-antenna codebook of LTE, and the second codebook $B_i$ may be selected from a two-antenna codebook of LTE, or forms of the first codebook $A_i$ and the second codebook $B_i$ may be separately defined in another manner.

In this embodiment, in step 703, for a codebook that includes a block matrix $X_i$ in a matrix W1, a first codebook $A_i$ represents a codebook corresponding to a horizontal direction of a two-dimensional planar array antenna, a second codebook $B_i$ represents a codebook corresponding to a vertical direction of the two-dimensional planar array antenna, and selection of the first codebook $A_i$ and selection of the second codebook $B_i$ are mutually independent; therefore, a precoding matrix W in this embodiment can reflect a characteristic that characteristics of the horizontal direction and the vertical direction of the two-dimensional planar array antenna are mutually independent. Therefore, a transmit end performs precoding based on a precoding matrix that is fed back by a receive end and is selected from a codebook structure in the present invention, which can effectively improve precoding precision, thereby reducing a performance loss and improving a system throughput.

In specific implementation of the foregoing embodiment, considering that a change of a channel in a vertical direction is slower than a change of a channel in a horizontal direction, where the change of the channel herein refers to a change of a channel response in a time domain, a frequency domain or a space domain, different quantization methods may be used in a horizontal direction and a vertical direction. In the different quantization methods, quantization granularities or quantization ranges are different, that is, different quantization methods are used for the first codebook $A_i$ and the second codebook $B_i$. The different quantization methods may specifically include three manners. In a first manner, a quantization granularity of the first codebook $A_i$ is less than a quantization granularity of the second codebook $B_i$, for example, the quantization granularity of the first codebook is $\pi/32$, that is, a phase corresponding to each vector in space in which vectors constitute the first codebook is an integer multiple of $\pi/32$, and the quantization granularity of the second codebook is $\pi/16$, that is, a phase corresponding to each vector in space in which vectors constitute the second codebook is an integer multiple of $\pi/16$. In a second manner, all phase differences between any two adjacent vectors in space in which vectors constitute the first codebook $A_i$ are equal, that is, the first codebook $A_i$ is an evenly quantized codebook, and at least two phase differences in space in which vectors constitute the second codebook $B_i$ are not equal, where each phase difference is a phase difference between two adjacent vectors in the constituent vector space, that is, the second codebook $B_i$ is an unevenly quantized codebook; for example, a phase difference between any two adjacent vectors in the space in which the vectors constitute the first codebook $A_i$ is π/32, and in the space in which the vectors constitute the second codebook $B_i$, a phase difference between the first vector and the adjacent second vector is π/24, and a phase difference between the $22^{nd}$ vector and the adjacent $23^{rd}$ vector is π/28. In a third manner, the first codebook $A_i$ uses an evenly quantized codebook, that is, all phase differences between any two adjacent code words in the codebook are equal, and the second codebook $B_i$ uses an unevenly quantized codebook, that is, all phase differences between any two adjacent code words in the codebook are not equal; or a codebook in which any two adjacent code words have a smaller phase difference may be used as the first codebook $A_i$, and a codebook in which any two adjacent code words have a larger phase difference may be used as the second codebook $B_i$, that is, the quantization granularity of the first codebook $A_i$ is made less than that of the second codebook $B_i$.

In one implementation manner, each column of the first codebook $A_i$ is an M-dimensional discrete Fourier transform DFT vector, where M may be corresponding to a quantity of transmit antennas in a horizontal direction, M>1, and all phase differences between any two adjacent columns of DFT vectors are equal.

Each column of the second codebook $B_i$ is an N-dimensional DFT vector, where N may be corresponding to a quantity of transmit antennas in a vertical direction, N>1, and at least two phase differences between two adjacent columns of DFT vectors are not equal.

More specifically, each column of the first codebook $A_i$ may be selected at an equal interval from $N_a$ M-dimensional DFT vectors that are distributed at an equal interval within a phase range [0, 2π], and $N_a$>1. Each column of the second codebook may be selected from $N_e$ N-dimensional DFT vectors that are distributed at an unequal interval within a phase range [0, π], and $N_e$>1.

In other words, there are $N_a$ DFT vectors in a horizontal direction, and there are $N_e$ DFT vectors in a vertical direction; in this case, a phase corresponding to each DFT vector in a horizontal direction is one of $N_a$ phases that are divided in the range [0, 2π], and a phase corresponding to each DFT vector in a vertical direction is one of $N_e$ phases that are divided in the range [0, π]. It should be noted that the phase range [0, 2π] in the horizontal direction and the phase range [0, π] in the vertical direction are only examples. In the following description, the ranges in the examples are also used, but another range may be used in specific implementation.

According to characteristics of the channel in the horizontal direction and the channel in the vertical direction, it may be specified that the phase range [0, 2π] in the horizontal direction is evenly divided, and the phase range [0, π] in the vertical direction is unevenly divided, that is, it may be specified that all differences between any two adjacent phases of $N_a$ phases are the same, and all differences between any two adjacent phases of $N_e$ phases are not the same. For example, some DFT vectors in the vertical direction are corresponding to ($2N_e/3$) phases that are evenly divided in a range [0, π/2], and the other DFT vectors are corresponding to ($N_e/3$) phases that are evenly divided in a range [π/2, π]. That is, by using π/2 as a center, the phases corresponding to the DFT vectors in the vertical direction are respectively selected upward or downward by a granularity k or a granularity d. Herein, the granularity k for upward selection is greater than or equal to the granularity d for downward selection.

In another implementation manner, because the change of the channel in the vertical direction is slower than the change of the channel in the horizontal direction, a quantity of candidate codebooks of the first codebook may be made greater than or equal to a quantity of candidate codebooks of the second codebook. Specifically, for example, a quantity of block matrices $X_i$ in the W1 is $N_B$, and a quantity of first codebooks $A_i$ and a quantity of second codebooks $B_i$ may also be $N_B$. However, in this implementation manner, because the change of the channel in the vertical direction is slower than the change of the channel in the horizontal direction, a quantity of second codebooks $B_i$ may be made less than $N_B$. For example, the quantity of second codebooks $B_i$ is $N_B/2$, and when being used, each second codebook $B_i$ is used twice, and constituted block matrices are respectively as follows: $X_1=A_1 \otimes B_1$, $X_2=A_2 \otimes B_1$, $X_3=A_3 \otimes B_2$, $X_4=A_4 \otimes B_2$, ..., and $X_{N_B}=A_{N_B} \otimes B_{N_B/2}$.

In this manner, the quantity of second codebooks $B_i$ is smaller, and therefore, feedback overheads of a network can be reduced.

Still further, in another implementation manner, a phase difference between any two adjacent columns of DFT vectors in the second codebook $B_i$ is greater than or equal to a phase difference between any two adjacent columns of DFT vectors in the first codebook $A_i$. That is, a phase interval between DFT vectors in the second codebook $B_i$ is greater than a phase interval between DFT vectors in the first codebook $A_i$, that is, the DFT vectors in the second codebook $B_i$ are sparser. Therefore, a characteristic that the change of the channel in the vertical direction is slower than the change of the channel in the horizontal direction can also be reflected.

Figure 8:
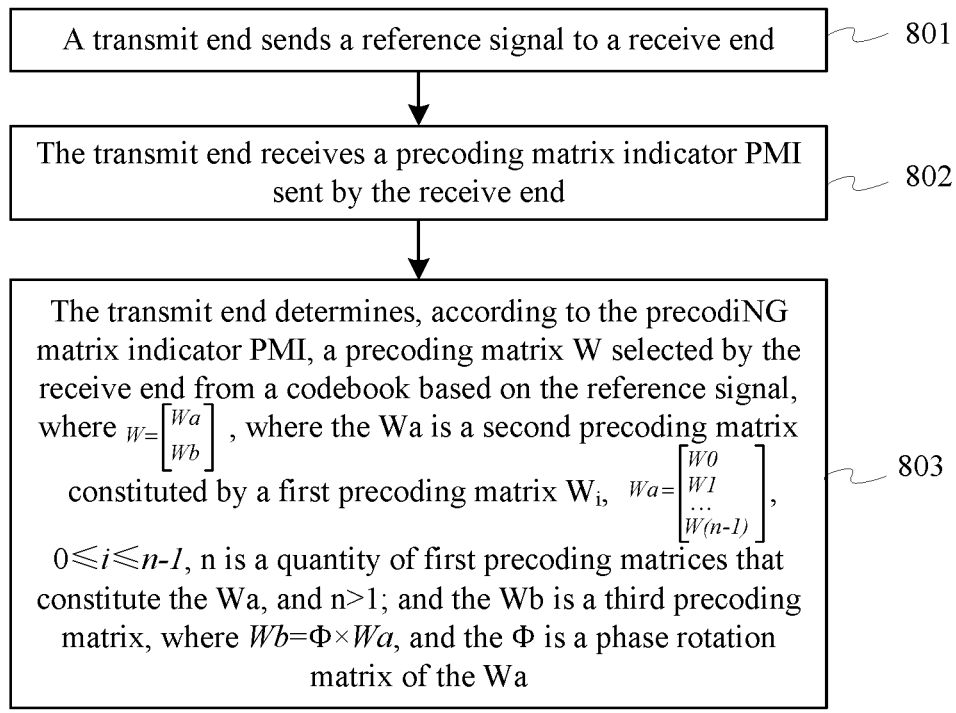
FIG. 8 is a flowchart of Embodiment 3 of a method for determining a precoding matrix according to the present invention.

FIG. 8 is a flowchart of Embodiment 3 of a method for determining a precoding matrix according to the present invention. An execution body of this embodiment is a transmit end, which may be a base station or a UE. When the execution body, that is, the transmit end, is a base station, correspondingly, a receive end may be a UE; when the execution body, that is, the transmit end, is a UE, correspondingly, the receive end may be a base station. The method for determining a precoding matrix in this embodiment is corresponding to Embodiment 3 of the method for determining a precoding matrix indicator shown in FIG. 5. As shown in FIG. 8, the method in this embodiment may include the following steps:

Step 801: The transmit end sends a reference signal to the receive end.

It should be noted that a type of the reference signal in step 801 is not limited in this embodiment of the present invention. For example, the reference signal may be a channel state information-reference signal (Channel State Information Reference Signal, CSI RS), a demodulation reference signal (Demodulation RS, DM RS), or a cell-specific reference signal (Cell-specific RS, CRS), and CSI may further include a channel quality indicator (Channel Quality Indicator/Index, CQI for short). It should be further noted that by receiving a notification (such as radio resource control (Radio Resource Control, RRC) signaling or downlink control information (Downlink Control Information, DCI)) of the base station or based on a cell identity ID, the UE may obtain a resource configuration of the reference signal and obtain the reference signal on a corresponding resource or in a corresponding subframe.

Step 802: The transmit end receives a precoding matrix indicator PMI sent by the receive end.

Step 803: The transmit end determines, according to the precoding matrix indicator PMI, a precoding matrix W selected by the receive end from a codebook based on the reference signal, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \leq i \leq n-1$, n is a quantity of first precoding matrices that constitute the Wa, and n>1; and the Wb is a third precoding matrix, where Wb=Φ×Wa, and the Φ is a phase rotation matrix of the Wa.

Specifically, after receiving the PMI, the transmit end may obtain the precoding matrix W according to the PMI and according to a correspondence that is in the 3GPP TS 36.213 and is between a PMI and a precoding matrix W.

For a two-dimensional planar array of a dual-polarized antenna (that is, a two-dimensional antenna planar array includes at least two polarization directions, for example, the two polarization directions may be positive 45 degrees and negative 45 degrees or 0 degrees and 90 degrees), the second precoding matrix Wa may represent a precoding matrix in a first polarization direction, where n may be a quantity of antenna ports in a vertical direction, that is, a quantity of rows of two-dimensional planar array antennas, and the third precoding matrix Wb may represent a precoding matrix in a second polarization direction.

Selection of the second precoding matrix Wa may be as follows: For example, for 2×4 two-dimensional planar array antennas, that is, there are two rows of the antennas, and there are four antennas in each row, the Wa may be:

$$Wa = \begin{bmatrix} W0 \\ W1 \end{bmatrix},$$

and the W0 and the W1 may be separately selected from a four-antenna codebook in an LTE system, where the W0 and the W1 may be selected as same codebooks, or may be selected as different codebooks, which is not limited in this embodiment of the present invention.

Because it may be considered that the precoding matrix in the second polarization direction may be obtained by rotating the precoding matrix in the first polarization direction by a specific phase, and characteristics of polarization phase rotation corresponding to each row of antennas in a vertical direction are mutually independent, the third precoding matrix Wb may be obtained by multiplying the second precoding matrix Wa by the phase rotation matrix Φ. Specifically, the third precoding matrix Wb may be indicated as:

$$Wb = \Phi \times Wa = \Phi \times \begin{bmatrix} W0 \\ W1 \\ \ldots \\ W(n-1) \end{bmatrix},$$

in this case, the third precoding matrix Wb can reflect a characteristic that phase rotation is independently performed on each row of two-dimensional planar array antennas corresponding to the second precoding matrix Wa.

In this embodiment, a receive end selects a precoding matrix W from a codebook based on a reference signal, where $$W = \begin{bmatrix} Wa \\ Wb \end{bmatrix};$$

a structure in which the Wa and the Wb are connected in parallel is used, where the Wa and the Wb respectively represent characteristics of a first polarization direction and a second polarization direction, and the Wb is obtained by independently performing phase rotation on each row of the Wa, so that a characteristic that polarization phases in a horizontal direction and a vertical direction of a two-dimensional planar array antenna are mutually independent can be reflected, and a characteristic that phase rotation on each row in the vertical direction is independent can be reflected. Therefore, a transmit end performs precoding based on a precoding matrix that is fed back by the receive end and is constructed in a codebook structure in the present invention, which can effectively improve precoding precision, thereby reducing a performance loss and improving a system throughput.

Further, in step 803 in the foregoing embodiment, the phase rotation matrix Φ may be a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

where n>1, and $\varphi_i = e^{j\theta_i}$, $\theta_i \in [0, 2\pi]$. A specific value of $\theta_i$ may be preset. For example, the value of $\theta_i$ may be selected from a phase corresponding to any constellation point in an existing modulation manner in the LTE Long Term Evolution system, where the modulation manner may be quadrature phase shift keying (Quadrature Phase Shift Keying, QPSK for short), 8 phase shift keying (8 Phase Shift Keying, 8PSK for short), 16 phase quadrature amplitude modulation (16 Quadrature Amplitude Modulation, 16QAM for short), or the like. For example, for the QPSK, phases corresponding to four constellation points are respectively $\{0, \pi/2, \pi, 3\pi/2\}$.

Specifically, each column of the first precoding matrix $W_i$ may be a discrete Fourier transform (Discrete Fourier Transform, DFT for short) vector, or may be a column vector of a Hadamard matrix.

Specifically, the first precoding matrix $W_i$ may be selected from a two-antenna codebook, a four-antenna codebook, or an eight-antenna codebook in the Long Term Evolution LTE system.

Figure 9:
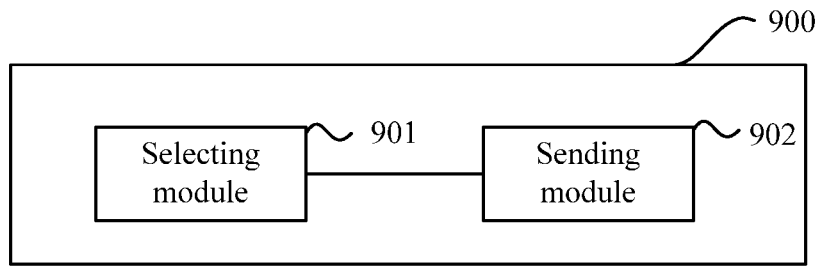
FIG. 9 is a schematic structural diagram of Embodiment 1 of a receive end according to the present invention.

FIG. 9 is a schematic structural diagram of Embodiment 1 of a receive end 900 according to the present invention. As shown in FIG. 9, the receive end 900 in this embodiment may include: a selecting module 901 and a sending module 902. The selecting module 901 may be configured to select a precoding matrix W from a codebook based on a reference signal sent by a transmit end, where the precoding matrix W is a product of two matrices W1 and W2, where the W1 includes $N_B$ block matrices $X_i$, $N_B \geq 1$, and the $W_1$ is indicated as: W1=diag{$X_1, \ldots, X_{N_B}$}, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij} \otimes B_{ij}$.

The sending module 902 may be configured to send a precoding matrix indicator PMI corresponding to the precoding matrix W to the transmit end, so that the transmit end obtains the precoding matrix W of an antenna array at the receive end according to the PMI.

Further, all columns of the block matrix $X_i$ are obtained by pairwisely successively calculating Kronecker products of N1 consecutive first vectors and N2 consecutive second vectors.

Further, N1 is greater than or equal to N2.

Further, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

Further, s1 is greater than or equal to s2.

The receive end in this embodiment may be configured to execute the technical solution in the method embodiment shown in FIG. 3. Implementation principles thereof are similar, and details are not described herein again.

According to the receive end in this embodiment, for a codebook that includes a block matrix $X_i$ in a matrix W1, a column $x_{i,j}$ that is of each block matrix $X_i$ and represents a beam is defined in a form of a three-dimensional beam vector. Specifically, the column of the block matrix is obtained in a manner of calculating a Kronecker product of a first vector $A_{ij}$ that is corresponding to a phase in a horizontal direction and a second vector $B_{ij}$ that is corresponding to a phase in a vertical direction, which indicates that the phase in the horizontal direction and the phase in the vertical direction are combined, so that a characteristic of the three-dimensional beam vector can be reflected in the codebook. Therefore, a transmit end performs precoding based on a precoding matrix that is fed back by the receive end and is selected from a codebook structure in the present invention, which can effectively improve precoding precision, thereby reducing a performance loss and improving a system throughput.

Figure 10:
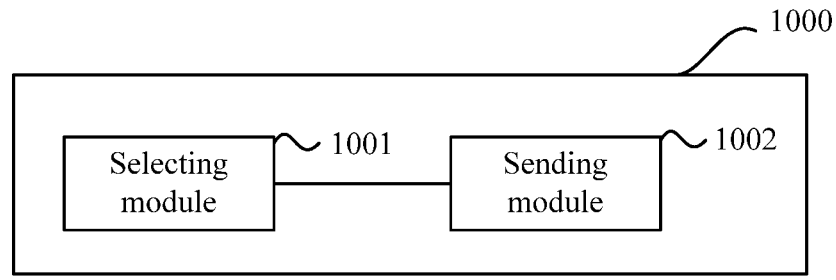
FIG. 10 is a schematic structural diagram of Embodiment 2 of a receive end according to the present invention.

FIG. 10 is a schematic structural diagram of Embodiment 2 of a receive end 1000 according to the present invention. As shown in FIG. 10, the receive end 1000 in this embodiment may include: a selecting module 1001 and a sending module 1002. The selecting module 1001 may be configured to select a precoding matrix W from a codebook based on a reference signal sent by a transmit end, where the precoding matrix W is a product of a matrix W1 and a matrix W2, where the W1 includes $N_B$ block matrices $X_i$, $N_B \geq 1$, and the $W_1$ is indicated as: W1=diag{$X_1, \ldots, X_{N_B}$}, where $1 \leq i \leq N_B$, each block matrix $X_i$ is a Kronecker product of a first codebook $A_i$ and a second codebook $B_i$, that is, $X_i=A_i \otimes B_i$, each column of the first codebook $A_i$ is an M-dimensional discrete Fourier transform DFT vector, M>1, each column of the second codebook $B_i$ is an N-dimensional DFT vector, and N>1.

The sending module 1002 may be configured to send a precoding matrix indicator PMI corresponding to the precoding matrix W to the transmit end.

Further, all phase differences between any two adjacent columns of DFT vectors in the first codebook $A_i$ are equal.

Further, each column of the first codebook is selected at an equal interval from $N_a$ M-dimensional DFT vectors that are distributed at an equal interval within a phase range [0, 2π], and $N_a>1$.

Further, at least two phase differences between two adjacent columns of DFT vectors in the second codebook $B_i$ are not equal.

Further, each column of the second codebook is selected from $N_e$ N-dimensional DFT vectors that are distributed at an unequal interval within a phase range [0, π], and $N_e>1$.

Further, a quantity of first codebooks is greater than or equal to a quantity of second codebooks.

Further, a phase difference between any two adjacent columns of DFT vectors in the second codebook $B_i$ is greater than or equal to a phase difference between any two adjacent columns of DFT vectors in the first codebook $A_i$.

Further, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

Further, the matrix W2 is used to select a column vector of the matrix W1 to constitute the matrix W, or is used to perform a weighted combination on column vectors of the matrix W1 to constitute the matrix W.

The receive end in this embodiment may be configured to execute the technical solution in the method embodiment shown in FIG. 4. Implementation principles thereof are similar, and details are not described herein again.

According to the receive end in this embodiment, for a codebook that includes a block matrix $X_i$ in a matrix W1, a first codebook $A_i$ represents a codebook corresponding to a horizontal direction of a two-dimensional planar array antenna, a second codebook $B_i$ represents a codebook corresponding to a vertical direction of the two-dimensional planar array antenna, and selection of the first codebook $A_i$ and selection of the second codebook $B_i$ are mutually independent; therefore, a precoding matrix W in this embodiment can reflect a characteristic that characteristics of the horizontal direction and the vertical direction of the two-dimensional planar array antenna are mutually independent. Therefore, a transmit end performs precoding based on a precoding matrix that is fed back by the receive end and is selected from a codebook structure in the present invention, which can effectively improve precoding precision, thereby reducing a performance loss and improving a system throughput.

Figure 11:
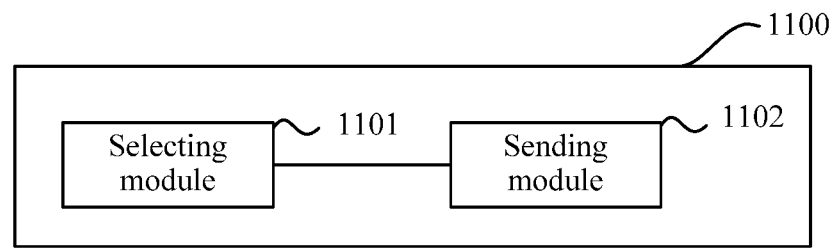
FIG. 11 is a schematic structural diagram of Embodiment 3 of a receive end according to the present invention.

FIG. 11 is a schematic structural diagram of Embodiment 3 of a receive end 1100 according to the present invention. As shown in FIG. 11, the receive end 1100 in this embodiment may include: a selecting module 1101 and a sending module 1102.

The selecting module 1101 may be configured to select a precoding matrix W from a codebook based on a reference signal sent by a transmit end, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \le i \le n-1$, n is a quantity of first precoding matrices that constitute the Wa, and n>1; and the Wb is a third precoding matrix, where Wb=Φ×Wa, and the Φ is a phase rotation matrix of the Wa.

The sending module 1102 may be configured to send a precoding matrix indicator PMI corresponding to the precoding matrix W to the transmit end.

Further, the phase rotation matrix is a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

and $\varphi_i = e^{j\Theta_i}$, $\Theta_i \in [0, 2\pi]$.

Further, each column of the first precoding matrix is a discrete Fourier transform DFT vector, or a column vector of a Hadamard matrix.

Further, the first precoding matrix is selected from a two-antenna codebook, a four-antenna codebook, or an eight-antenna codebook in a Long Term Evolution LTE system.

The receive end in this embodiment may be configured to execute the technical solution in the method embodiment shown in FIG. 5. Implementation principles thereof are similar, and details are not described herein again.

The receive end in this embodiment selects a precoding matrix W from a codebook based on a reference signal, where $$W = \begin{bmatrix} Wa \\ Wb \end{bmatrix};$$

a structure in which the Wa and the Wb are connected in parallel is used, where the Wa and the Wb respectively represent characteristics of a first polarization direction and a second polarization direction, and the Wb is obtained by independently performing phase rotation on each row of the Wa, so that a characteristic that polarization phases in a horizontal direction and a vertical direction of a two-dimensional planar array antenna are mutually independent can be reflected, and a characteristic that phase rotation on each row in the vertical direction is independent can be reflected. Therefore, a transmit end performs precoding based on a precoding matrix that is fed back by the receive end and is constructed in a codebook structure in the present invention, which can effectively improve precoding precision, thereby reducing a performance loss and improving a system throughput.

Figure 12:
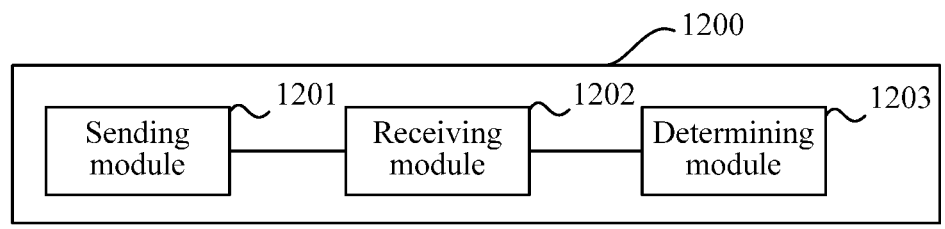
FIG. 12 is a schematic structural diagram of Embodiment 1 of a transmit end according to the present invention.

FIG. 12 is a schematic structural diagram of Embodiment 1 of a transmit end according to the present invention. The transmit end may be a base station or a terminal. As shown in FIG. 12, the transmit end 1200 in this embodiment may include: a sending module 1201, a receiving module 1202, and a determining module 1203, where: the sending module 1201 may be configured to send a reference signal to a receive end 1200; the receiving module 1202 may be configured to receive a precoding matrix indicator PMI sent by the receive end; and the determining module 1203 may be configured to determine, according to the precoding matrix indicator PMI, a precoding matrix W selected by the receive end from a codebook based on the reference signal, where the precoding matrix W is a product of two matrices W1 and W2, where the W1 includes $N_B$ block matrices $X_i$, $N_B \ge 1$, and the $W_1$ is indicated as: W1=diag$\{X_1, \ldots, X_{N_B}\}$, where $1 \le i \le N_B$, and a column $x_{i,j}$ of each block matrix $X_i$ is a Kronecker product of a first vector $A_{ij}$ and a second vector $B_{ij}$, that is, $x_{ij} = A_{ij} \otimes B_{ij}$.

Further, all columns of the block matrix $X_i$ are obtained by pairwisely successively calculating Kronecker products of N1 consecutive first vectors and N2 consecutive second vectors.

Further, N1 is greater than or equal to N2.

Further, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

Further, s1 is greater than or equal to s2.

The transmit end in this embodiment may be configured to execute the technical solution in the method embodiment shown in FIG. 6. Implementation principles thereof are similar, and details are not described herein again.

According to the transmit end in this embodiment, for a codebook that includes a block matrix $X_i$ in a matrix W1, a column $x_{i,j}$ that is of each block matrix $X_i$ and represents a beam is defined in a form of a three-dimensional beam vector. Specifically, the column of the block matrix is obtained in a manner of calculating a Kronecker product of a first vector $A_{ij}$ that is corresponding to a phase in a horizontal direction and a second vector $B_{ij}$ that is corresponding to a phase in a vertical direction, which indicates that the phase in the horizontal direction and the phase in the vertical direction are combined, so that a characteristic of the three-dimensional beam vector can be reflected in the codebook. Therefore, the transmit end performs precoding based on a precoding matrix that is fed back by a receive end and is selected from a codebook structure in the present invention, which can effectively improve precoding precision, thereby reducing a performance loss and improving a system throughput.

Figure 13:
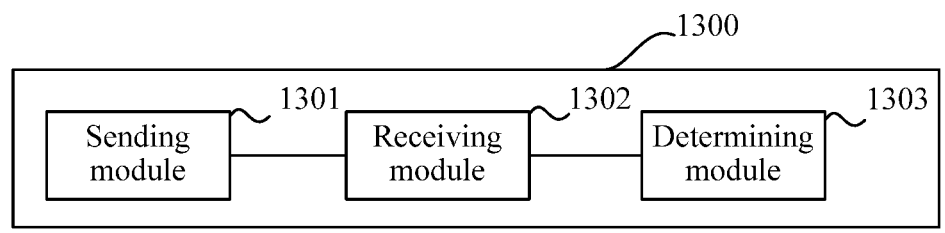
FIG. 13 is a schematic structural diagram of Embodiment 2 of a transmit end according to the present invention.

FIG. 13 is a schematic structural diagram of Embodiment 2 of a transmit end 1300 according to the present invention. As shown in FIG. 13, the transmit end 1300 in this embodiment may include: a sending module 1301, a receiving module 1302, and a determining module 1303, where the sending module 1301 may be configured to send a reference signal to a receive end; the receiving module 1302 may be configured to receive a precoding matrix indicator PMI sent by the receive end; and the determining module 1303 may be configured to determine, according to the precoding matrix indicator PMI, a precoding matrix W selected by the receive end from a codebook based on the reference signal, where the precoding matrix W is a product of a matrix W1 and a matrix W2, where the W1 includes $N_B$ block matrices $X_i$, $N_B \geq 1$, and the $W_1$ is indicated as: W1=diag{$X_1, \ldots, X_{N_B}$}, where $1 \leq i \leq N_B$, each block matrix $X_i$ is a Kronecker product of a first codebook $A_i$ and a second codebook $B_i$, that is $X_i = A_i \otimes B_i$, each column of the first codebook $A_i$ is an M-dimensional discrete Fourier transform DFT vector, M>1, each column of the second codebook $B_i$ is an N-dimensional DFT vector, and N>1.

Further, all phase differences between any two adjacent columns of DFT vectors in the first codebook $A_i$ are equal.

Further, each column of the first codebook is selected at an equal interval from $N_a$ M-dimensional DFT vectors that are distributed at an equal interval within a phase range [0, 2π], and $N_a > 1$.

Further, at least two phase differences between two adjacent columns of DFT vectors in the second codebook $B_i$ are not equal.

Further, each column of the second codebook is selected from $N_e$ N-dimensional DFT vectors that are distributed at an unequal interval within a phase range [0, π], and $N_e > 1$.

Further, a quantity of first codebooks is greater than or equal to a quantity of second codebooks.

Further, a phase difference between any two adjacent columns of DFT vectors in the second codebook $B_i$ is greater than or equal to a phase difference between any two adjacent columns of DFT vectors in the first codebook $A_i$.

Further, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

Further, the matrix W2 is used to select a column vector of the matrix W1 to constitute the matrix W, or is used to perform a weighted combination on column vectors of the matrix W1 to constitute the matrix W.

The transmit end in this embodiment may be configured to execute the technical solution in the method embodiment shown in FIG. 7. Implementation principles thereof are similar, and details are not described herein again.

According to the transmit end in this embodiment, for a codebook that includes a block matrix $X_i$ in a matrix W1, a first codebook $A_i$ represents a codebook corresponding to a horizontal direction of a two-dimensional planar array antenna, a second codebook $B_i$ represents a codebook corresponding to a vertical direction of the two-dimensional planar array antenna, and selection of the first codebook $A_i$ and selection of the second codebook $B_i$ are mutually independent; therefore, a precoding matrix W in this embodiment can reflect a characteristic that characteristics of the horizontal direction and the vertical direction of the two-dimensional planar array antenna are mutually independent. Therefore, the transmit end performs precoding based on a precoding matrix that is fed back by a receive end and is selected from a codebook structure in the present invention, which can effectively improve precoding precision, thereby reducing a performance loss and improving a system throughput.

Figure 14:
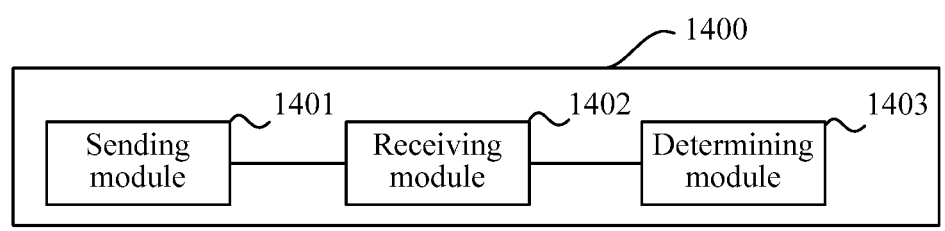
FIG. 14 is a schematic structural diagram of Embodiment 3 of a transmit end according to the present invention.

FIG. 14 is a schematic structural diagram of Embodiment 3 of a transmit end 1400 according to the present invention. As shown in FIG. 14, the transmit end 1400 in this embodiment may include: a sending module 1401, which may be configured to send a reference signal to a receive end; a receiving module 1402, which may be configured to receive a precoding matrix indicator PMI sent by the receive end; and a determining module 1403, which may be configured to determine, according to the precoding matrix indicator PMI, a precoding matrix W selected by the receive end from a codebook based on the reference signal, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \leq i \leq n-1$, n is a quantity of first precoding matrices that constitute the Wa, and n>1; and the Wb is a third precoding matrix, where Wb=Φ×Wa, and the Φ is a phase rotation matrix of the Wa.

Further, the phase rotation matrix is a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

and $\varphi_i = e^{j\theta_i}$, $\theta_i \in [0, 2\pi]$.

Further, each column of the first precoding matrix is a discrete Fourier transform DFT vector, or a column vector of a Hadamard matrix.

Further, the first precoding matrix is selected from a two-antenna codebook, a four-antenna codebook, or an eight-antenna codebook in a Long Term Evolution LTE system.

The transmit end in this embodiment may be configured to execute the technical solution in the method embodiment shown in FIG. 8. Implementation principles thereof are similar, and details are not described herein again.

According to the transmit end in this embodiment, a precoding matrix $$W = \begin{bmatrix} Wa \\ Wb \end{bmatrix}$$

uses a structure in which the Wa and the Wb are connected in parallel, where the Wa and the Wb respectively represent characteristics of a first polarization direction and a second polarization direction, and the Wb is obtained by independently performing phase rotation on each row of the Wa, so that a characteristic that polarization phases in a horizontal direction and a vertical direction of a two-dimensional planar array antenna are mutually independent can be reflected, and a characteristic that phase rotation on each row in the vertical direction is independent can be reflected. Therefore, the transmit end performs precoding based on a precoding matrix that is fed back by a receive end and is constructed in a codebook structure in the present invention, which can effectively improve precoding precision, thereby reducing a performance loss and improving a system throughput.

Figure 15:
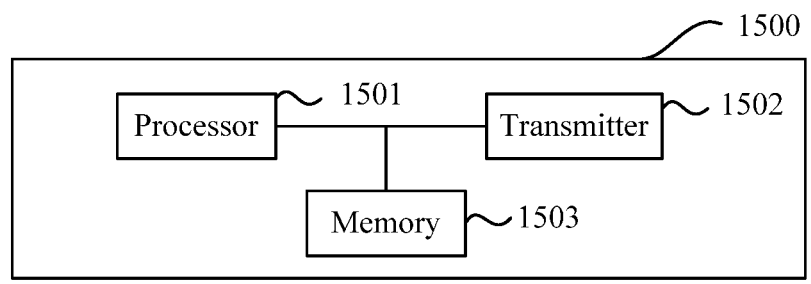
FIG. 15 is a schematic diagram of a hardware structure of Embodiment 1 of a receiving device according to the present invention.

FIG. 15 is a schematic diagram of a hardware structure of Embodiment 1 of a receiving device 1500 according to the present invention. The receiving device may be a base station or a terminal. As shown in FIG. 15, the receiving device 1500 in this embodiment may include: a processor 1501 and a transmitter 1502. Optionally, the receiving device 1500 may further include a memory 1503. The processor 1501, the transmitter 1502, and the memory 1503 may be connected by using a system bus or in another manner, and an example of connection by using a system bus is used in FIG. 15. The system bus may be an ISA bus, a PCI bus, an EISA bus, or the like. The system bus may be classified into an address bus, a data bus, a control bus, and the like. To facilitate illustration, only one line is used in FIG. 15 to represent the bus, but it does not indicate that there is only one bus or only one type of buses.

The processor 1501 may be configured to select a precoding matrix W from a codebook based on a reference signal sent by a sending device, where the precoding matrix W is a product of two matrices W1 and W2, where the W1 includes $N_B$ block matrices $X_i$, $N_B \geq 1$, and the $W_1$ is indicated as: $W1=\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij} \otimes B_{ij}$.

The transmitter 1502 may be configured to send a precoding matrix indicator PMI corresponding to the precoding matrix W to the sending device, so that the sending device obtains the precoding matrix W of an antenna array of the receiving device 1500 according to the PMI.

Further, all columns of the block matrix $X_i$ are obtained by pairwisely successively calculating Kronecker products of N1 consecutive first vectors and N2 consecutive second vectors.

Further, N1 is greater than or equal to N2.

Further, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

Further, s1 is greater than or equal to s2.

The receiving device in this embodiment may be configured to execute the technical solution in the method embodiment shown in FIG. 3. Implementation principles thereof are similar, and details are not described herein again.

According to the receiving device in this embodiment, for a codebook that includes a block matrix $X_i$ in a matrix W1, a column $x_{i,j}$ that is of each block matrix $X_i$ and represents a beam is defined in a form of a three-dimensional beam vector. Specifically, the column of the block matrix is obtained in a manner of calculating a Kronecker product of a first vector $A_{ij}$ that is corresponding to a phase in a horizontal direction and a second vector $B_{ij}$ that is corresponding to a phase in a vertical direction, which indicates that the phase in the horizontal direction and the phase in the vertical direction are combined, so that a characteristic of the three-dimensional beam vector can be reflected in the codebook. Therefore, a sending device performs precoding based on a precoding matrix that is fed back by the receiving device and is selected from a codebook structure in the present invention, which can effectively improve precoding precision, thereby reducing a performance loss and improving a system throughput.

Figure 16:
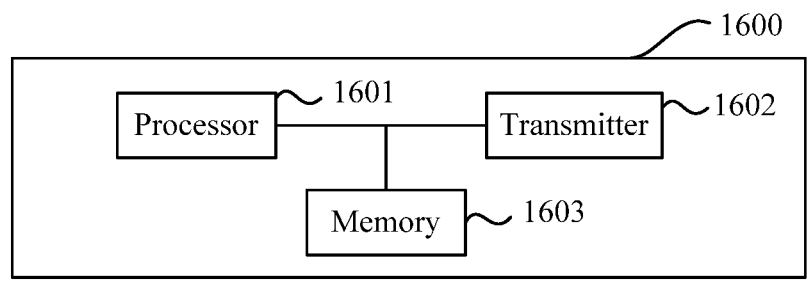
FIG. 16 is a schematic diagram of a hardware structure of Embodiment 2 of a receiving device according to the present invention.

FIG. 16 is a schematic diagram of a hardware structure of Embodiment 2 of a receiving device 1600 according to the present invention. The receiving device may be a base station or a terminal. As shown in FIG. 16, the receiving device 1600 in this embodiment may include: a processor 1601 and a transmitter 1602. Optionally, the receiving device 1600 may further include a memory 1603. The processor 1601, the transmitter 1602, and the memory 1603 may be connected by using a system bus or in another manner, and an example of connection by using a system bus is used in FIG. 16. The system bus may be an ISA bus, a PCI bus, an EISA bus, or the like. The system bus may be classified into an address bus, a data bus, a control bus, and the like. To facilitate illustration, only one line is used in FIG. 16 to represent the bus, but it does not indicate that there is only one bus or only one type of buses.

The processor 1601 may be configured to select a precoding matrix W from a codebook based on a reference signal sent by a sending device, where the precoding matrix W is a product of a matrix W1 and a matrix W2, where the W1 includes $N_B$ block matrices $X_i$, $N_B \geq 1$, and the $W_1$ is indicated as: $W1=\text{diag}\{X_1, \ldots, X_{N_B}\}$, where $1 \leq i \leq N_B$, each block matrix $X_i$ is a Kronecker product of a first codebook $A_i$ and a second codebook $B_i$, that is, $X_i=A_i \otimes B_i$, each column of the first codebook $A_i$ is an M-dimensional discrete Fourier transform DFT vector, M>1, each column of the second codebook $B_i$ is an N-dimensional DFT vector, and N>1.

The transmitter 1602 may be configured to send a precoding matrix indicator PMI corresponding to the precoding matrix W to the sending device.

Further, all phase differences between any two adjacent columns of DFT vectors in the first codebook $A_i$ are equal.

Further, each column of the first codebook is selected at an equal interval from $N_a$ M-dimensional DFT vectors that are distributed at an equal interval within a phase range [0, $2\pi$], and $N_a > 1$.

Further, at least two phase differences between two adjacent columns of DFT vectors in the second codebook $B_i$ are not equal.

Further, each column of the second codebook is selected from $N_e$ N-dimensional DFT vectors that are distributed at an unequal interval within a phase range [0, $\pi$], and $N_e > 1$.

Further, a quantity of first codebooks is greater than or equal to a quantity of second codebooks.

Further, a phase difference between any two adjacent columns of DFT vectors in the second codebook $B_i$ is greater than or equal to a phase difference between any two adjacent columns of DFT vectors in the first codebook $A_i$.

Further, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

Further, the matrix W2 is used to select a column vector of the matrix W1 to constitute the matrix W, or is used to perform a weighted combination on column vectors of the matrix W1 to constitute the matrix W.

The receiving device in this embodiment may be configured to execute the technical solution in the method embodiment shown in FIG. 4. Implementation principles thereof are similar, and details are not described herein again.

According to the receiving device in this embodiment, for a codebook that includes a block matrix $X_i$ in a matrix W1, a first codebook $A_i$ represents a codebook corresponding to a horizontal direction of a two-dimensional planar array antenna, a second codebook $B_i$ represents a codebook corresponding to a vertical direction of the two-dimensional planar array antenna, and selection of the first codebook $A_i$ and selection of the second codebook $B_i$ are mutually independent; therefore, a precoding matrix W in this embodiment can reflect a characteristic that characteristics of the horizontal direction and the vertical direction of the two-dimensional planar array antenna are mutually independent. Therefore, a sending device performs precoding based on a precoding matrix that is fed back by the receiving device and is selected from a codebook structure in the present invention, which can effectively improve precoding precision, thereby reducing a performance loss and improving a system throughput.

Figure 17:
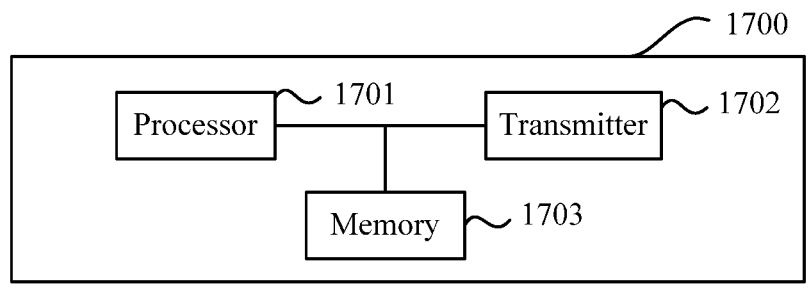
FIG. 17 is a schematic diagram of a hardware structure of Embodiment 3 of a receiving device according to the present invention.

FIG. 17 is a schematic diagram of a hardware structure of Embodiment 3 of a receiving device 1700 according to the present invention. The receiving device may be a base station or a terminal. As shown in FIG. 17, the receiving device 1700 in this embodiment may include: a processor 1701 and a transmitter 1702. Optionally, the receiving device 1700 may further include a memory 1703. The processor 1701, the transmitter 1702, and the memory 1703 may be connected by using a system bus or in another manner, and an example of connection by using a system bus is used in FIG. 17. The system bus may be an ISA bus, a PCI bus, an EISA bus, or the like. The system bus may be classified into an address bus, a data bus, a control bus, and the like. To facilitate illustration, only one line is used in FIG. 17 to represent the bus, but it does not indicate that there is only one bus or only one type of buses.

The processor 1701 may be configured to select a precoding matrix W from a codebook based on a reference signal sent by a sending device, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \leq i \leq n-1$, n is a quantity of first precoding matrices that constitute the Wa, and n>1; and the Wb is a third precoding matrix, where Wb=Φ×Wa, and the Φ is a phase rotation matrix of the Wa.

The transmitter 1702 may be configured to send a precoding matrix indicator PMI corresponding to the precoding matrix W to the sending device.

Further, the phase rotation matrix is a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

and $\varphi_i = e^{j\theta_i}$, $\theta_i \in [0, 2\pi]$.

Further, each column of the first precoding matrix is a discrete Fourier transform DFT vector, or a column vector of a Hadamard matrix.

Further, the first precoding matrix is selected from a two-antenna codebook, a four-antenna codebook, or an eight-antenna codebook in a Long Term Evolution LTE system.

The receiving device in this embodiment may be configured to execute the technical solution in the method embodiment shown in FIG. 5. Implementation principles thereof are similar, and details are not described herein again.

The receiving device in this embodiment selects a precoding matrix W from a codebook based on a reference signal, where $$W = \begin{bmatrix} Wa \\ Wb \end{bmatrix};$$

a structure in which the Wa and the Wb are connected in parallel is used, where the Wa and the Wb respectively represent characteristics of a first polarization direction and a second polarization direction, and the Wb is obtained by independently performing phase rotation on each row of the Wa, so that a characteristic that polarization phases in a horizontal direction and a vertical direction of a two-dimensional planar array antenna are mutually independent can be reflected, and a characteristic that phase rotation on each row in the vertical direction is independent can be reflected. Therefore, a sending device performs precoding based on a precoding matrix that is fed back by the receiving device and is constructed in a codebook structure in the present invention, which can effectively improve precoding precision, thereby reducing a performance loss and improving a system throughput.

Figure 18:
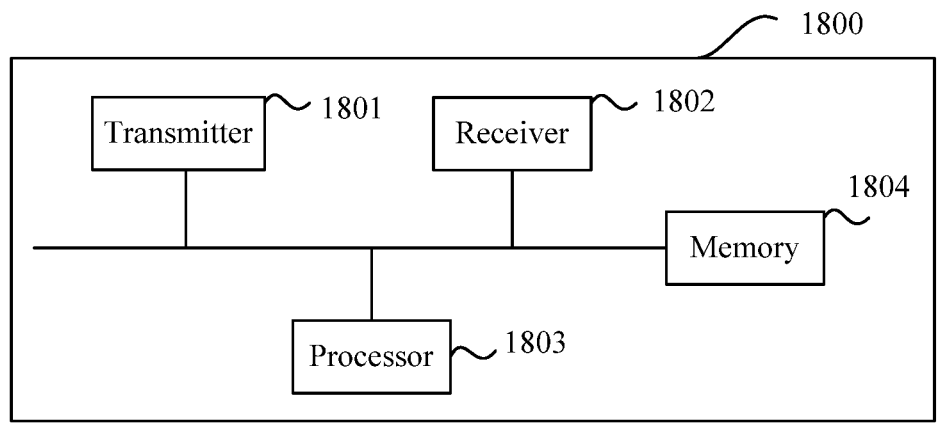
FIG. 18 is a schematic diagram of a hardware structure of Embodiment 1 of a sending device according to the present invention.

FIG. 18 is a schematic diagram of a hardware structure of Embodiment 1 of a sending device 1800 according to the present invention. The sending device may be a base station or a terminal. As shown in FIG. 18, the sending device 1800 in this embodiment may include: a transmitter 1801, a receiver 1802, and a processor 1803. Optionally, the receiving device 1800 may further include a memory 1804. The transmitter 1801, the receiver 1802, the processor 1803, and the memory 1804 may be connected by using a system bus or in another manner, and an example of connection by using a system bus is used in FIG. 18. The system bus may be an ISA bus, a PCI bus, an EISA bus, or the like. The system bus may be classified into an address bus, a data bus, a control bus, and the like. To facilitate illustration, only one line is used in FIG. 18 to represent the bus, but it does not indicate that there is only one bus or only one type of buses.

The transmitter 1801 may be configured to send a reference signal to a receiving device; the receiver 1802 may be configured to receive a precoding matrix indicator PMI sent by the receiving device; the processor 1803 may be configured to determine, according to the precoding matrix indicator PMI, a precoding matrix W selected by the receiving device from a codebook based on the reference signal, where the precoding matrix W is a product of two matrices W1 and W2, where the W1 includes $N_B$ block matrices $X_i$, $N_B \geq 1$, and the W1 is indicated as: W1=diag$\{X_1, \ldots, X_{N_B}\}$, where $1 \leq i \leq N_B$, and a column $x_{i,j}$ of each block matrix $X_i$ is a Kronecker product of a first vector $A_{ij}$ and a second vector $B_{ij}$, that is, $x_{ij}=A_{ij} \otimes B_{ij}$.

Further, all columns of the block matrix $X_i$ are obtained by pairwisely successively calculating Kronecker products of N1 consecutive first vectors and N2 consecutive second vectors.

Further, N1 is greater than or equal to N2.

Further, for any two adjacent block matrices $X_i$ and $X_{i+1}$, if second vectors that constitute the $X_i$ and the $X_{i+1}$ are N2 same consecutive second vectors, where N2 is greater than 0, there are s1 same first vectors in two groups of first vectors that constitute the $X_i$ and the $X_{i+1}$, and s1 is greater than or equal to 0; and for any two adjacent block matrices $X_i$ and $X_{i+1}$, if first vectors that constitute the $X_i$ and the $X_{i+1}$ are N1 same consecutive first vectors, where N1 is greater than 0, there are s2 same second vectors in two groups of second vectors that constitute the $X_i$ and the $X_{i+1}$, and s2 is greater than or equal to 0.

Further, s1 is greater than or equal to s2.

The sending device in this embodiment may be configured to execute the technical solution in the method embodiment shown in FIG. 6. Implementation principles thereof are similar, and details are not described herein again.

According to the sending device in this embodiment, for a codebook that includes a block matrix $X_i$ in a matrix W1, a column $x_{i,j}$ that is of each block matrix $X_i$ and represents a beam is defined in a form of a three-dimensional beam vector. Specifically, the column of the block matrix is obtained in a manner of calculating a Kronecker product of a first vector $A_{ij}$ that is corresponding to a phase in a horizontal direction and a second vector $B_{ij}$ that is corresponding to a phase in a vertical direction, which indicates that the phase in the horizontal direction and the phase in the vertical direction are combined, so that a characteristic of the three-dimensional beam vector can be reflected in the codebook. Therefore, the sending device performs precoding based on a precoding matrix that is fed back by a receiving device and is selected from a codebook structure in the present invention, which can effectively improve precoding precision, thereby reducing a performance loss and improving a system throughput.

Figure 19:
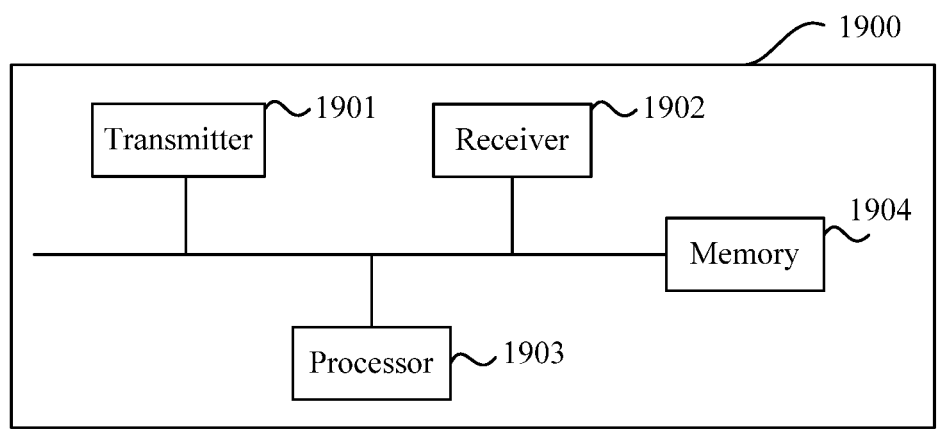
FIG. 19 is a schematic diagram of a hardware structure of Embodiment 2 of a sending device according to the present invention.

FIG. 19 is a schematic diagram of a hardware structure of Embodiment 2 of a sending device 1900 according to the present invention. The sending device may be a base station or a terminal. As shown in FIG. 19, the sending device 1900 in this embodiment may include: a transmitter 1901, a receiver 1902, and a processor 1903. Optionally, the sending device 1900 may further include a memory 1904. The transmitter 1901, the receiver 1902, the processor 1903, and the memory 1904 may be connected by using a system bus or in another manner, and an example of connection by using a system bus is used in FIG. 19. The system bus may be an ISA bus, a PCI bus, an EISA bus, or the like. The system bus may be classified into an address bus, a data bus, a control bus, and the like. To facilitate illustration, only one line is used in FIG. 19 to represent the bus, but it does not indicate that there is only one bus or only one type of buses.

The transmitter 1901 may be configured to send a reference signal to a receiving device; the receiver 1902 may be configured to receive a precoding matrix indicator PMI sent by the receiving device; the processor 1903 may be configured to determine, according to the precoding matrix indicator PMI, a precoding matrix W selected by the receiving device from a codebook based on the reference signal, where the precoding matrix W is a product of a matrix W and a matrix W2, where the W1 includes $N_B$ block matrices $X_i$, $N_B \geq 1$, and the $W_1$ is indicated as: $W1 = \text{diag}\{X_1, \ldots, X_{N_B}\}$, where $1 \leq i \leq N_B$, each block matrix $X_i$ is a Kronecker product of a first codebook $A_i$ and a second codebook $B_i$, that is, $X_i = A_i \otimes B_i$, each column of the first codebook $A_i$ is an M-dimensional discrete Fourier transform DFT vector, M>1, each column of the second codebook $B_i$ is an N-dimensional DFT vector, and N>1.

Further, all phase differences between any two adjacent columns of DFT vectors in the first codebook $A_i$ are equal.

Further, each column of the first codebook is selected at an equal interval from $N_a$ M-dimensional DFT vectors that are distributed at an equal interval within a phase range [0, 2π], and $N_a > 1$.

Further, at least two phase differences between two adjacent columns of DFT vectors in the second codebook $B_i$ are not equal.

Further, each column of the second codebook is selected from $N_e$ N-dimensional DFT vectors that are distributed at an unequal interval within a phase range [0, π], and $N_e > 1$.

Further, a quantity of first codebooks is greater than or equal to a quantity of second codebooks.

Further, a phase difference between any two adjacent columns of DFT vectors in the second codebook $B_i$ is greater than or equal to a phase difference between any two adjacent columns of DFT vectors in the first codebook $A_i$.

Further, the W1 is a matrix that indicates a channel characteristic of a wideband, and the W2 is a matrix that indicates a channel characteristic of a sub-band; or the W1 is a matrix that indicates a long-term channel characteristic, and the W2 is a matrix that indicates a short-term channel characteristic.

Further, the matrix W2 is used to select a column vector of the matrix W1 to constitute the matrix W, or is used to perform a weighted combination on column vectors of the matrix W1 to constitute the matrix W.

The sending device in this embodiment may be configured to execute the technical solution in the method embodiment shown in FIG. 7. Implementation principles thereof are similar, and details are not described herein again.

According to the sending device in this embodiment, for a codebook that includes a block matrix $X_i$ in a matrix W1, a first codebook $A_i$ represents a codebook corresponding to a horizontal direction of a two-dimensional planar array antenna, a second codebook $B_i$ represents a codebook corresponding to a vertical direction of the two-dimensional planar array antenna, and selection of the first codebook $A_i$ and selection of the second codebook $B_i$ are mutually independent; therefore, a precoding matrix W in this embodiment can reflect a characteristic that characteristics of the horizontal direction and the vertical direction of the two-dimensional planar array antenna are mutually independent. Therefore, the sending device performs precoding based on a precoding matrix that is fed back by a receiving device and is selected from a codebook structure in the present invention, which can effectively improve precoding precision, thereby reducing a performance loss and improving a system throughput.

Figure 20:
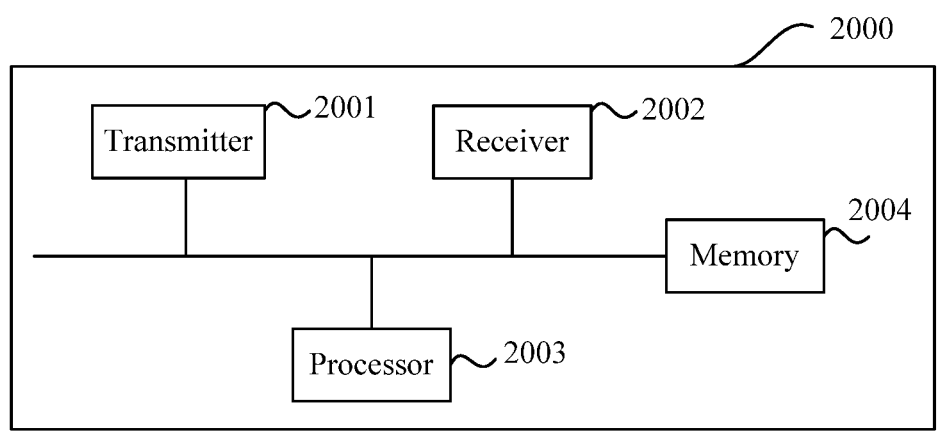
FIG. 20 is a schematic diagram of a hardware structure of Embodiment 3 of a sending device according to the present invention.

FIG. 20 is a schematic diagram of a hardware structure of Embodiment 3 of a sending device 2000 according to the present invention. The sending device may be a base station or a terminal. As shown in FIG. 20, the sending device 2000 in this embodiment may include: a transmitter 2001, a receiver 2002, and a processor 2003. Optionally, the sending device 2000 may further include a memory 2004. The transmitter 2001, the receiver 2002, the processor 2003, and the memory 2004 may be connected by using a system bus or in another manner, and an example of connection by using a system bus is used in FIG. 20. The system bus may be an ISA bus, a PCI bus, an EISA bus, or the like. The system bus may be classified into an address bus, a data bus, a control bus, and the like. To facilitate illustration, only one line is used in FIG. 20 to represent the bus, but it does not indicate that there is only one bus or only one type of buses.

The transmitter 2001 may be configured to send a reference signal to a receiving device; the receiver 2002 may be configured to receive a precoding matrix indicator PMI sent by the receiving device; the processor 2003 may be configured to determine, according to the precoding matrix indicator PMI, a precoding matrix W selected by the receiving device from a codebook based on the reference signal, where $$W = \begin{bmatrix} Wa \\ Wb \end{bmatrix},$$

where the Wa is a second precoding matrix that includes a first precoding matrix $W_i$, $$Wa = \begin{bmatrix} W0 \\ W1 \\ \ldots \\ W(n-1) \end{bmatrix},$$

$0 \le i \le n-1$, n is a quantity of first precoding matrices that constitute the Wa, and n>1; and the Wb is a third precoding matrix, where Wb=Φ×Wa, and the Φ is a phase rotation matrix of the Wa.

Further, the phase rotation matrix is a diagonal matrix $$\Phi = \begin{bmatrix} \varphi_0 & \ldots & 0 \\ \ldots & \ldots & \ldots \\ 0 & \ldots & \varphi_{n-1} \end{bmatrix},$$

and $\varphi_i = e^{j\Theta_i}$, $\Theta_i \in [0, 2\pi]$.

Further, each column of the first precoding matrix is a discrete Fourier transform DFT vector, or a column vector of a Hadamard matrix.

Further, the first precoding matrix is selected from a two-antenna codebook, a four-antenna codebook, or an eight-antenna codebook in a Long Term Evolution LTE system.

The sending device in this embodiment may be configured to execute the technical solution in the method embodiment shown in FIG. 8. Implementation principles thereof are similar, and details are not described herein again.

According to the sending device in this embodiment, a precoding matrix $$W = \begin{bmatrix} Wa \\ Wb \end{bmatrix}$$

uses a structure in which the Wa and the Wb are connected in parallel, where the Wa and the Wb respectively represent characteristics of a first polarization direction and a second polarization direction, and the Wb is obtained by independently performing phase rotation on each row of the Wa, so that a characteristic that polarization phases in a horizontal direction and a vertical direction of a two-dimensional planar array antenna are mutually independent can be reflected, and a characteristic that phase rotation on each row in the vertical direction is independent can be reflected. Therefore, the sending device performs precoding based on a precoding matrix that is fed back by a receiving device and is constructed in a codebook structure in the present invention, which can effectively improve precoding precision, thereby reducing a performance loss and improving a system throughput.

Figure 21:
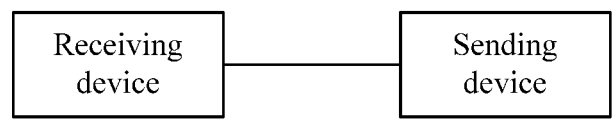
FIG. 21 is a schematic structural diagram of an embodiment of a communications system according to the present invention.

FIG. 21 is a schematic structural diagram of an embodiment of a communications system 2100 according to the present invention. As shown in FIG. 21, the system 2100 in this embodiment includes: a receiving device and a sending device, where the receiving device may use a structure of any device embodiment in FIG. 15 to FIG. 17, and accordingly, may execute a technical solution of any method embodiment in FIG. 3 to FIG. 5, and the sending device may use a structure of any device embodiment in FIG. 18 to FIG. 20, and accordingly, may execute a technical solution of any method embodiment in FIG. 6 to FIG. 8. Implementation principles and technical effects of this embodiment are similar to those of the method embodiments and the device embodiments, and details are not described herein again.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that: the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method comprising:
   selecting, by a receive end, a precoding matrix W from a codebook based on a reference signal from a transmit end, wherein the precoding matrix W is a product of a first matrix W1 and a second matrix W2, wherein
   the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij} \otimes B_{ij}$, wherein a quantity N2 of second vectors in the second codebook $B_i$ is less than or equal to a quantity N1 of first vectors in the first codebook $A_i$; and
   sending, by the receive end, a precoding matrix indicator (PMI) corresponding to the precoding matrix W to the transmit end.

2. The method according to claim 1, the second matrix W2 is used to select at least one column vector of the first matrix W1 to constitute the precoding matrix W, or is used to perform a weighted combination on column vectors of the first matrix W1 to constitute the precoding matrix W.

3. The method according to claim 1, wherein the first matrix W1 is a matrix that indicates a channel characteristic of a wideband, and the second matrix W2 is a matrix that indicates a channel characteristic of a sub-band.

4. The method according to claim 1, $N_B$ is a quantity of polarization directions, or a quantity of antenna groups.

5. The method according to claim 1, wherein
the first vector $A_{ij}$ is a discrete Fourier transform (DFT) vector; and
the second vector $B_{ij}$ is a DFT vector.

6. The method according to claim 1, wherein the first codebook $A_i$ corresponds to a horizontal direction of a two-dimensional planar array antenna, and the second codebook $B_i$ corresponds to a vertical direction of the two-dimensional planar array antenna.

7. A method comprising:
sending, by a transmit end, a reference signal to a receive end;
receiving, by the transmit end, a precoding matrix indicator (PMI) from the receive end; and
determining, by the transmit end according to the PMI, a precoding matrix W, wherein the precoding matrix W is a product of a first matrix W1 and a second matrix W2, wherein
the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij}\otimes B_{ij}$, wherein a quantity N2 of second vectors in the second codebook $B_i$ is less than or equal to a quantity N1 of first vectors in the first codebook $A_i$.

8. The method according to claim 7, the second matrix W2 is used to select at least one column vector of the first matrix W1 to constitute the precoding matrix W, or is used to perform a weighted combination on column vectors of the first matrix W1 to constitute the precoding matrix W.

9. The method according to claim 7, wherein the first matrix W1 is a matrix that indicates a channel characteristic of a wideband, and the second matrix W2 is a matrix that indicates a channel characteristic of a sub-band.

10. The method according to claim 7, $N_B$ is a quantity of polarization directions, or a quantity of antenna groups.

11. The method according to claim 7, wherein
the first vector $A_{ij}$ is a discrete Fourier transform (DFT) vector; and
the second vector $B_{ij}$ is a DFT vector.

12. The method according to claim 7, wherein the first codebook $A_i$ corresponds to a horizontal direction of a two-dimensional planar array antenna, and the second codebook $B_i$ corresponds to a vertical direction of the two-dimensional planar array antenna.

13. An apparatus comprising:
a storage medium including executable instructions; and
a processor;
wherein the executable instructions, when executed by the processor, cause the apparatus to:
select a precoding matrix W from a codebook based on a reference signal from a transmit end, wherein the precoding matrix W is a product of a first matrix W1 and a second matrix W2, wherein
the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij}\otimes B_{ij}$, wherein a quantity N2 of second vectors in the second codebook $B_i$ is less than or equal to a quantity N1 of first vectors in the first codebook $A_i$; and
send a precoding matrix indicator (PMI) corresponding to the precoding matrix W to the transmit end.

14. The apparatus according to claim 13, the second matrix W2 is used to select at least one column vector of the first matrix W1 to constitute the precoding matrix W, or is used to perform a weighted combination on column vectors of the first matrix W1 to constitute the precoding matrix W.

15. The apparatus according to claim 13, wherein the first matrix W1 is a matrix that indicates a channel characteristic of a wideband, and the second matrix W2 is a matrix that indicates a channel characteristic of a sub-band.

16. The apparatus according to claim 13, $N_B$ is a quantity of polarization directions, or a quantity of antenna groups.

17. The apparatus according to claim 13, wherein
the first vector $A_{ij}$ is a discrete Fourier transform (DFT) vector; and
the second vector $B_{ij}$ is a DFT vector.

18. The apparatus according to claim 13, wherein the first codebook $A_i$ corresponds to a horizontal direction of a two-dimensional planar array antenna, and the second codebook $B_i$ corresponds to a vertical direction of the two-dimensional planar array antenna.

19. An apparatus comprising:
a storage medium including executable instructions; and
a processor;
wherein the executable instructions, when executed by the processor, cause the apparatus to:
send a reference signal to a receive end;
receive a precoding matrix indicator (PMI) from the receive end; and
determine, according to the PMI, a precoding matrix W, the precoding matrix W is a product of a first matrix W1 and a second matrix W2, wherein
the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij}\otimes B_{ij}$, wherein a quantity N2 of second vectors in the second codebook $B_i$ is less than or equal to a quantity N1 of first vectors in the first codebook $A_i$.

20. The apparatus according to claim 19, the second matrix W2 is used to select at least one column vector of the first matrix W1 to constitute the precoding matrix W, or is used to perform a weighted combination on column vectors of the first matrix W1 to constitute the precoding matrix W.

21. The apparatus according to claim 19, wherein the first matrix W1 is a matrix that indicates a channel characteristic of a wideband, and the second matrix W2 is a matrix that indicates a channel characteristic of a sub-band.

22. The apparatus according to claim 19, $N_B$ is a quantity of polarization directions, or a quantity of antenna groups.

23. The apparatus according to claim 19, wherein
the first vector $A_{ij}$ is a discrete Fourier transform (DFT) vector; and
the second vector $B_{ij}$ is a DFT vector.

24. The apparatus according to claim 19, wherein the first codebook $A_i$ corresponds to a horizontal direction of a two-dimensional planar array antenna, and the second codebook $B_i$ corresponds to a vertical direction of the two-dimensional planar array antenna.

25. An apparatus comprising:
a processor, configured to select a precoding matrix W from a codebook based on a reference signal from a transmit end, wherein the precoding matrix W is a product of a first matrix W1 and a second matrix W2, wherein
the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij} \otimes B_{ij}$, wherein a quantity N2 of second vectors in the second codebook $B_i$ is less than or equal to a quantity N1 of first vectors in the first codebook $A_i$; and
a transmitter, configured to send a precoding matrix indicator (PMI) corresponding to the precoding matrix W to the transmit end.

26. An apparatus comprising:
a transmitter, configured to send a reference signal to a receive end;
a receiver, configured to receive a precoding matrix indicator (PMI) from the receive end; and
a processor, configured to determine a precoding matrix W according to the PMI, wherein the precoding matrix W is a product of a first matrix W1 and a second matrix W2, wherein
the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij} \otimes B_{ij}$, wherein a quantity N2 of second vectors in the second codebook $B_i$ is less than or equal to a quantity N1 of first vectors in the first codebook $A_i$.

27. A non-transitory computer readable storage medium, configured to store executable instructions which, when executed by a processor, cause the processor to perform operations comprising:
selecting a precoding matrix W from a codebook based on a reference signal from a transmit end, wherein the precoding matrix W is a product of a first matrix W1 and a second matrix W2, wherein
the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij} \otimes B_{ij}$, wherein a quantity N2 of second vectors in the second codebook $B_i$ is less than or equal to a quantity N1 of first vectors in the first codebook $A_i$; and
sending a precoding matrix indicator (PMI) corresponding to the precoding matrix W to the transmit end.

28. A non-transitory computer readable storage medium, configured to store executable instructions which, when executed by a processor, cause the processor to perform operations comprising:
sending a reference signal to a receive end;
receiving a precoding matrix indicator (PMI) from the receive end; and
determining a precoding matrix W according to the PMI, wherein the precoding matrix W is a product of a first matrix W1 and a second matrix W2, wherein
the first matrix W1 comprises $N_B$ block matrices $X_i$, wherein $N_B$ is an integer greater than one, and the first matrix W1 is indicated as W1=diag$\{X_1, \ldots, X_{N_B}\}$, wherein an index i of the block matrix $X_i$ is greater than or equal to one and less than or equal to $N_B$, wherein a column $X_{ij}$ of each block matrix $X_i$ is a kronecker product of a first vector $A_{ij}$ in a first codebook $A_i$ and a second vector $B_{ij}$ in a second codebook $B_i$, that is, $X_{ij}=A_{ij} \otimes B_{ij}$, wherein a quantity N2 of second vectors in the second codebook $B_i$ is less than or equal to a quantity N1 of first vectors in the first codebook $A_i$.

* * * * *